US012273309B2

(12) United States Patent
Boyd et al.

(10) Patent No.: US 12,273,309 B2
(45) Date of Patent: Apr. 8, 2025

(54) PROVIDING PERMISSIONS FOR ACCESSING SHARED CONTENT COLLECTIONS

(71) Applicant: Snap Inc., Santa Monica, CA (US)

(72) Inventors: Nathan Kenneth Boyd, Los Angeles, CA (US); Siqi Chen, Marina del Rey, CA (US); Matthew Lee Cook, San Francisco, CA (US); Andrew Grosvenor Cooper, Los Angeles, CA (US); Benedict Copping, Los Angeles, CA (US); Edward Koai, Santa Monica, CA (US); Tao Marvin Liu, Marina de Rey, CA (US); Yiwen Zhan, Venice, CA (US); Mian Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/149,024

(22) Filed: Dec. 30, 2022

(65) Prior Publication Data
US 2023/0216817 A1 Jul. 6, 2023

Related U.S. Application Data

(60) Provisional application No. 63/295,338, filed on Dec. 30, 2021.

(51) Int. Cl.
*H04L 51/10* (2022.01)
(52) U.S. Cl.
CPC .................... *H04L 51/10* (2013.01)
(58) Field of Classification Search
CPC ...................................................... H04L 51/10

(Continued)

(56) References Cited

U.S. PATENT DOCUMENTS 9,961,155 B1 * 5/2018 Chan .................. H04L 61/50
10,805,254 B1 * 10/2020 Allen .................. H04W 4/21
(Continued)

FOREIGN PATENT DOCUMENTS

WO WO-2019136089 A1 7/2019
WO WO-2023130016 A1 7/2023

OTHER PUBLICATIONS

Saigal, "How to Share Files and Folders from OneDrive in Windows 10" retrieved from an internet article from https://www.howtogeek.com/233339/how-to-share-files-and-folders-from-onedrive-in-windows-10/, howtogeek magazine, Jan. 2016 ( Year: 2016).*

(Continued)

*Primary Examiner* — Nicholas R Taylor
*Assistant Examiner* — Chong G Kim
(74) *Attorney, Agent, or Firm* — Schwegman Lundberg & Woessner, P.A.

(57) ABSTRACT

Aspects of the present disclosure involve a system comprising a computer-readable storage medium storing a program and method for providing permissions for accessing shared content collections. The program and method provide for receiving, from a first device associated with a first user, an indication of first user input to share a content collection between the first user and a second user selected by the first user, the content collection comprising at least one media content item, the second user corresponding to a contact of the first user within a messaging application; storing the content collection in association with the first user and the second user; providing the first user with a first set of permissions for accessing the content collection; and providing the second user with a second set of permissions for accessing the content collection, the second set of permissions being more restrictive than the first set of permissions.

19 Claims, 15 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2014/0359085 | A1* | 12/2014 | Chen | H04L 63/102 709/220 |
| 2015/0180980 | A1* | 6/2015 | Welinder | H04L 67/06 715/758 |
| 2017/0093780 | A1* | 3/2017 | Lieb | G06F 16/587 |
| 2017/0372364 | A1* | 12/2017 | Andreou | G06F 3/04845 |
| 2018/0027268 | A1 | 1/2018 | Cheng | |
| 2018/0052587 | A1* | 2/2018 | LaPier | G06F 3/0482 |
| 2019/0166074 | A1* | 5/2019 | Voss | H04L 51/063 |
| 2019/0166400 | A1* | 5/2019 | Andreou | G06Q 50/01 |
| 2021/0011940 | A1* | 1/2021 | Tang | G06F 16/535 |
| 2021/0367914 | A1 | 11/2021 | Collins et al. | |
| 2021/0385179 | A1 | 12/2021 | Heikkinen et al. | |

OTHER PUBLICATIONS

"About Stories", [Online]. Retrieved from the Internet: <; https://support.snapchat.com/en-US/a/about-stories>, (2022), 3 pgs.

"New on TikTok: Introducing Stitch", [Online] Retrieved from the Internet: <https://newsroom.tiktok.com/en-us/new-on-tiktok-introducing-stitch>, [Retrieved on Nov. 9, 2022], (Sep. 3, 2020), 9 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Erinfolami, Keyede, "How To Remix Snaps On Snapchat", [Online]. Retrieved from the Internet: <https://techmende.com/how-to-remix-snaps-on-snapchat/>, (2022), 3 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Perez, Sarah, "Snapchat is developing its own take on TikTok Duets with anew 'Remix' feature", [Online]. Retrieved from the Internet: <https://techcrunch.com/2021/03/25/snapchat-is-developing-its-own-take-on-tiktok-duets-with-a-new-remix-feature/>, (Mar. 25, 2021), 9 pgs.

"International Application Serial No. PCT/US2022/082542, International Search Report mailed May 8, 2023", 4 pgs.

"International Application Serial No. PCT/US2022/082542, Written Opinion mailed May 8, 2023", 5 pgs.

"International Application Serial No. PCT/US2022/082542, International Preliminary Report on Patentability mailed Jul. 11, 2024", 7 pgs.

* cited by examiner

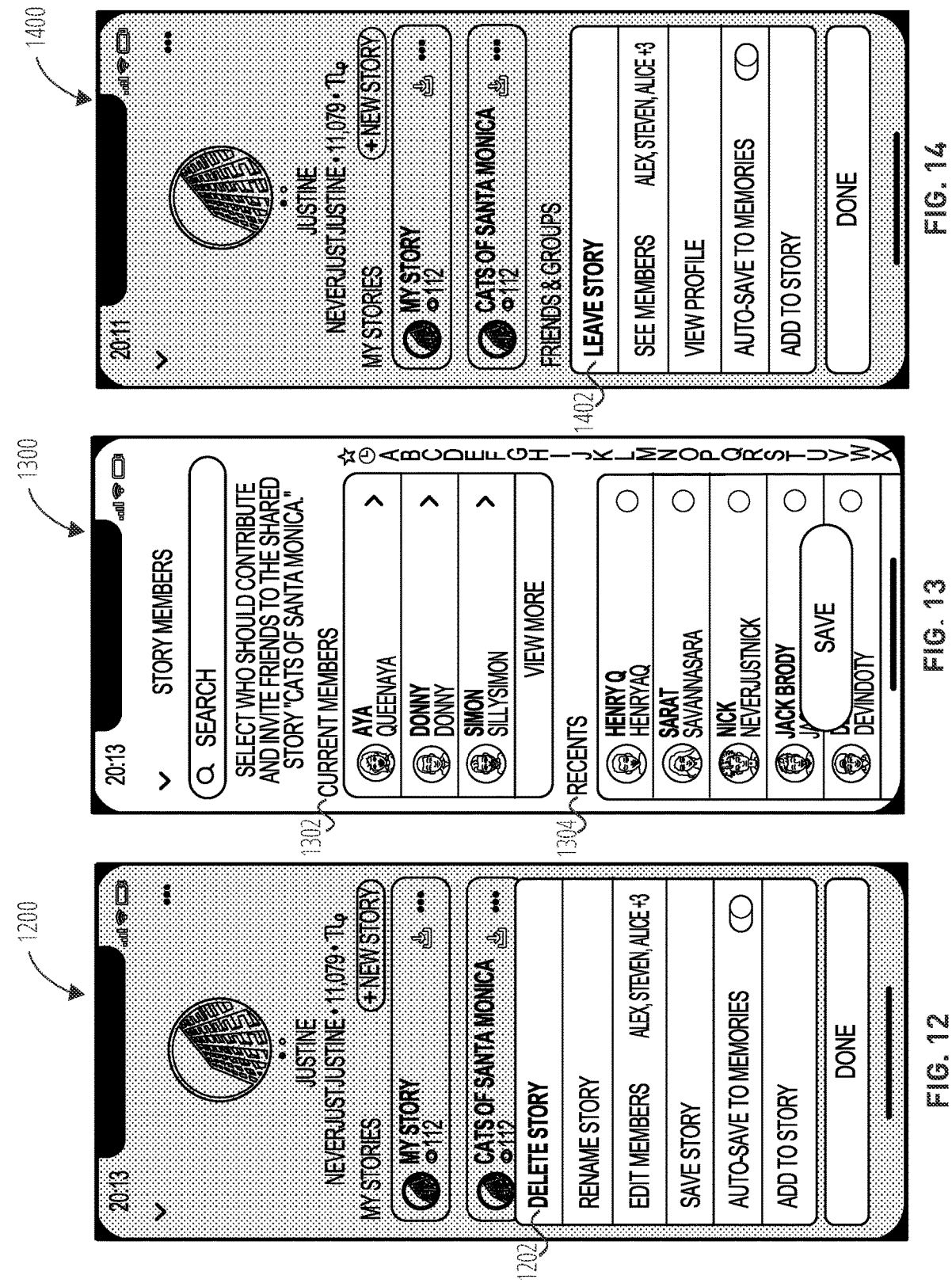

PROVIDING PERMISSIONS FOR ACCESSING SHARED CONTENT COLLECTIONS

CROSS-REFERENCE TO RELATED APPLICATION

This patent application claims the benefit of U.S. Provisional Patent Application No. 63/295,338, filed Dec. 30, 2021, entitled "PROVIDING PERMISSIONS FOR ACCESSING SHARED CONTENT COLLECTIONS", which is incorporated by reference herein in its entirety.

TECHNICAL FIELD

The present disclosure relates generally to a messaging system, including displaying content feeds within a messaging system.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 12 illustrates an example user interface indicating a set of permissions available to a creating user of a shared content collection, in accordance with some examples.

FIG. 13 illustrates an example user interface presented to a creating user of a shared content collection, for editing member users of the shared content collection, in accordance with some examples.

FIG. 14 illustrates an example user interface indicating a set of permissions available to a member user of a shared content collection, in accordance with some examples.

DETAILED DESCRIPTION

A messaging system typically allow users to exchange media content items (e.g., messages, images and/or video) with one another in a message thread. As described herein, a messaging system may include content feeds for presenting content collections, where each content collection includes one or more media content items.

The disclosed embodiments provide for a messaging system that allows a first user to create a content collection including one or more media content items. The messaging system provides for the first user to share the content collection with one or more second user(s) selected by the first user. In this way, each of the first user and second user(s) are associated with the content collection. By virtue of being associated with the content collection, each of the first user and the second user(s) is able to view the content collection, and to add content (e.g., additional media content items) to the content collection. In addition, each of the first user and second user(s) is permitted to share the content collection with one or more selected third user(s).

The messaging system may provide the first user, who created the content collection, with different permissions for accessing the content collection relative to the permissions provided to the second user(s) and third user(s). For example, all users associated with the shared content collection are permitted to share the content collection with additional users, to add media content to the content collection, and to view the content collection. However, the first user is further permitted to delete the content collection, rename the content collection and remove users associated with the content collection.

Figure 1:
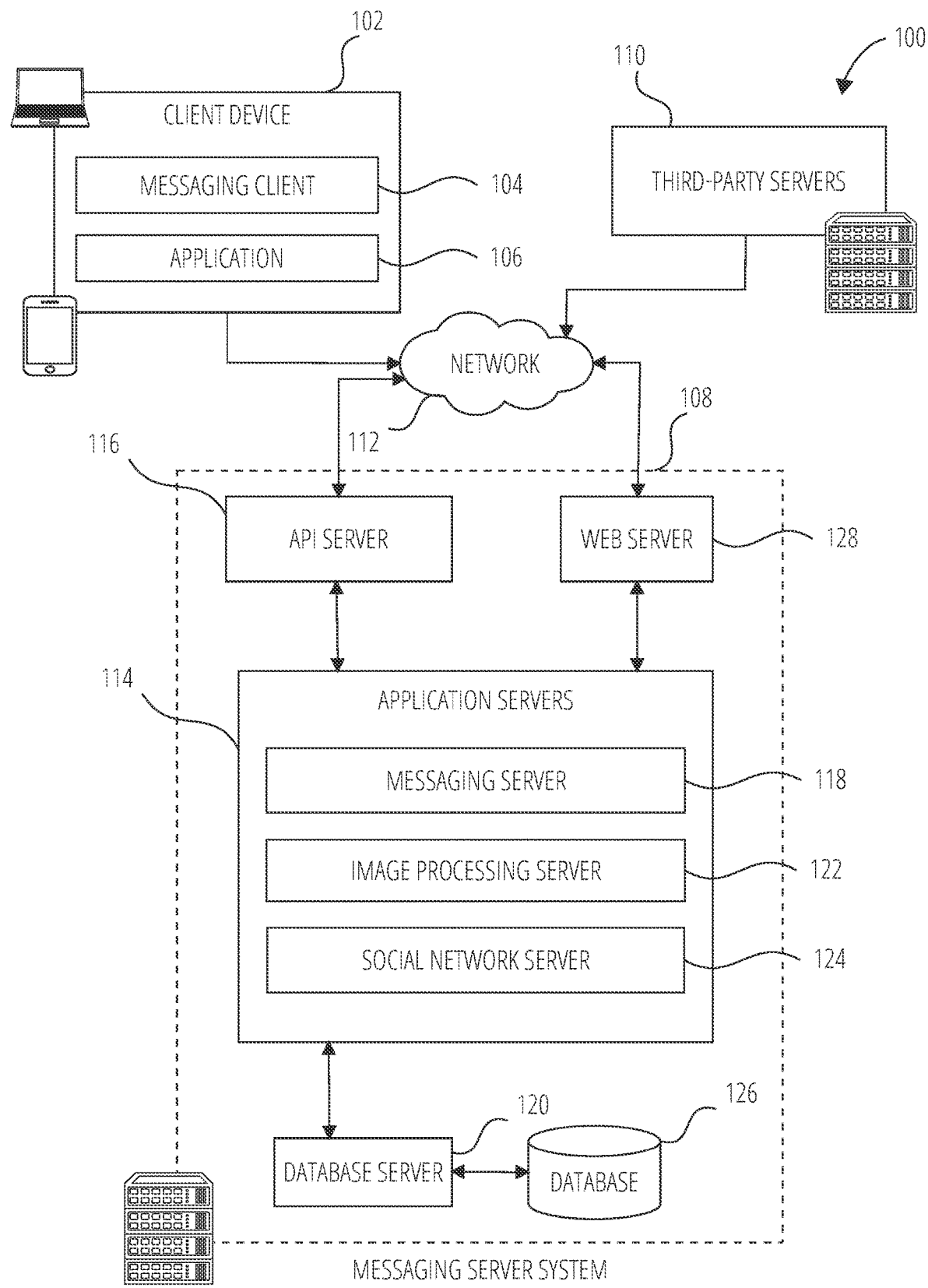
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
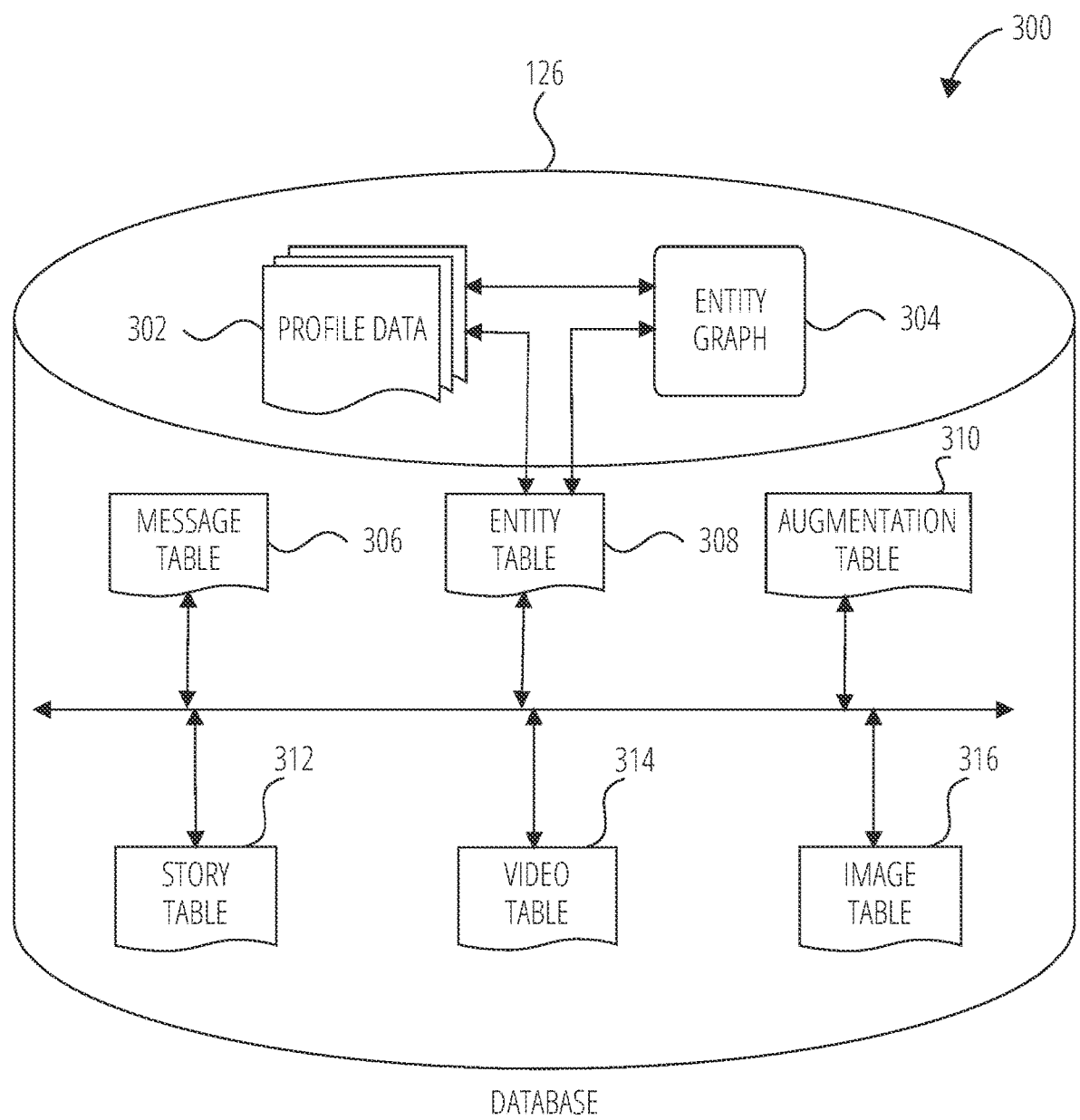
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
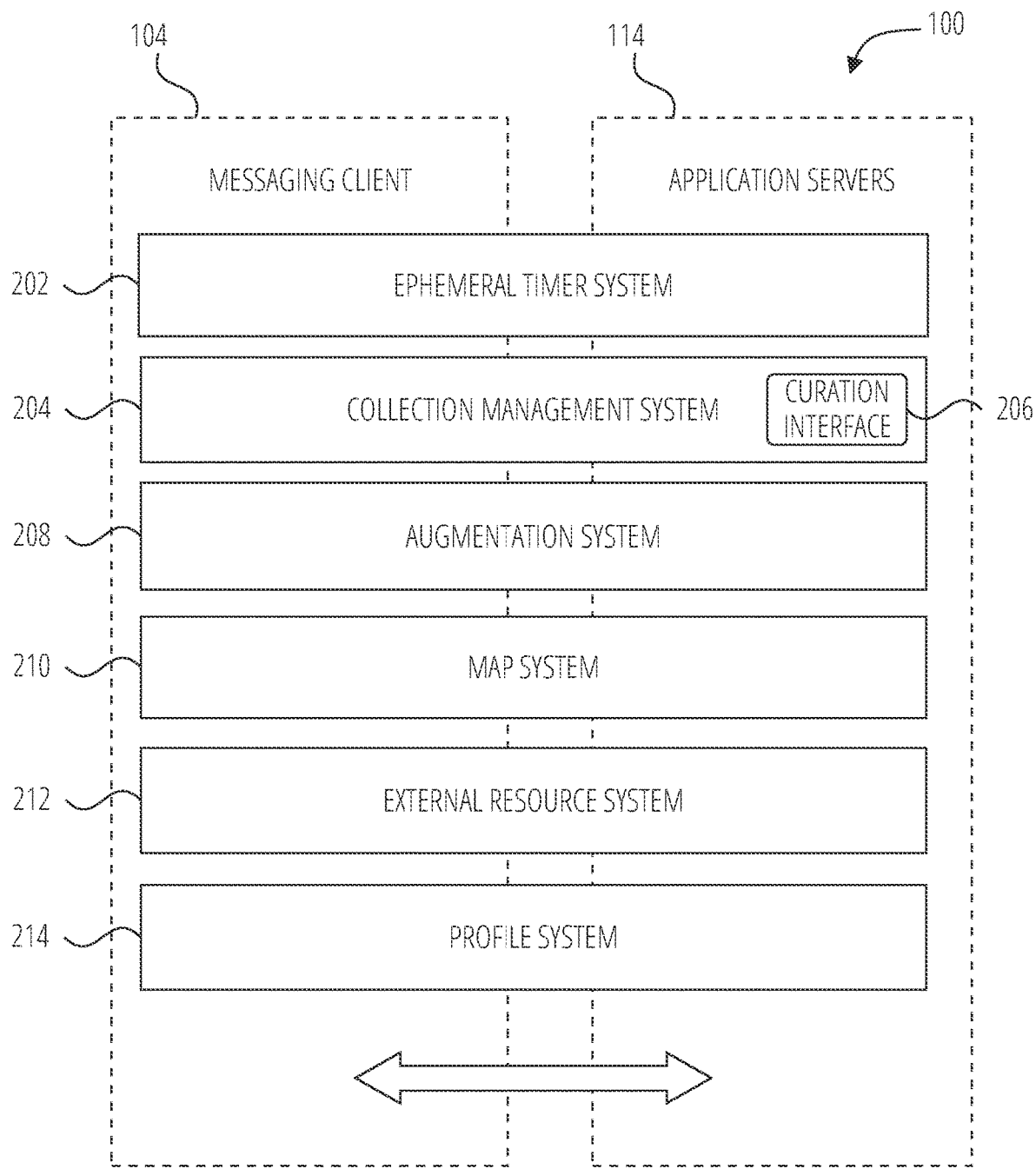
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, an external resource system 212, and a profile system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The profile system 214 implements various functions for maintaining profiles with respect to the messaging system 100. The profile data maintained by the profile system 214 may be selectively used and presented to other users of the messaging system 100, based on privacy settings specified by a particular entity.

From the perspective of an individual user, the profile system 214 provides for maintaining and presenting one or more of a self profile (e.g., "my profile"), friendship profiles, group profiles and public profiles. In one or more embodiments, a self profile corresponds to the individual user's own information in the messaging system such as a user name, telephone number, address, settings (e.g., notification and privacy settings), and/or a user-selected avatar representation (or collection of such avatar representations).

In one or more embodiments, a friendship profile includes information that is common to two users. Such information may include message content, such as but not limited to, images, videos, audio files, attachments, and messages (e.g., text-based messages), with any corresponding annotation data, exchanged within one or more message thread(s) with respect to the two users (e.g., friends). A group profile includes information similar to that of a friend profile, and applies to a group of users (e.g., 2 or more users).

In one or more embodiments, a public profile provides for maintaining and presenting information associated with an entity. For example, an entity associated with a public profile may be a publisher such as a merchant, business, social media influencer and/or advertiser. The entity may create a public profile to showcase their content to other users (e.g., all users) of the messaging system 100, instead of being limited to friends (e.g., in association with friend profiles). Moreover, the public profile provides for other users to select to subscribe to content provided by the entity (e.g., via a subscription button). For example, such content may be presented, along with other content from others, within a content feed provided by the messaging system 100.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 (e.g., in conjunction with the profile system 214) stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
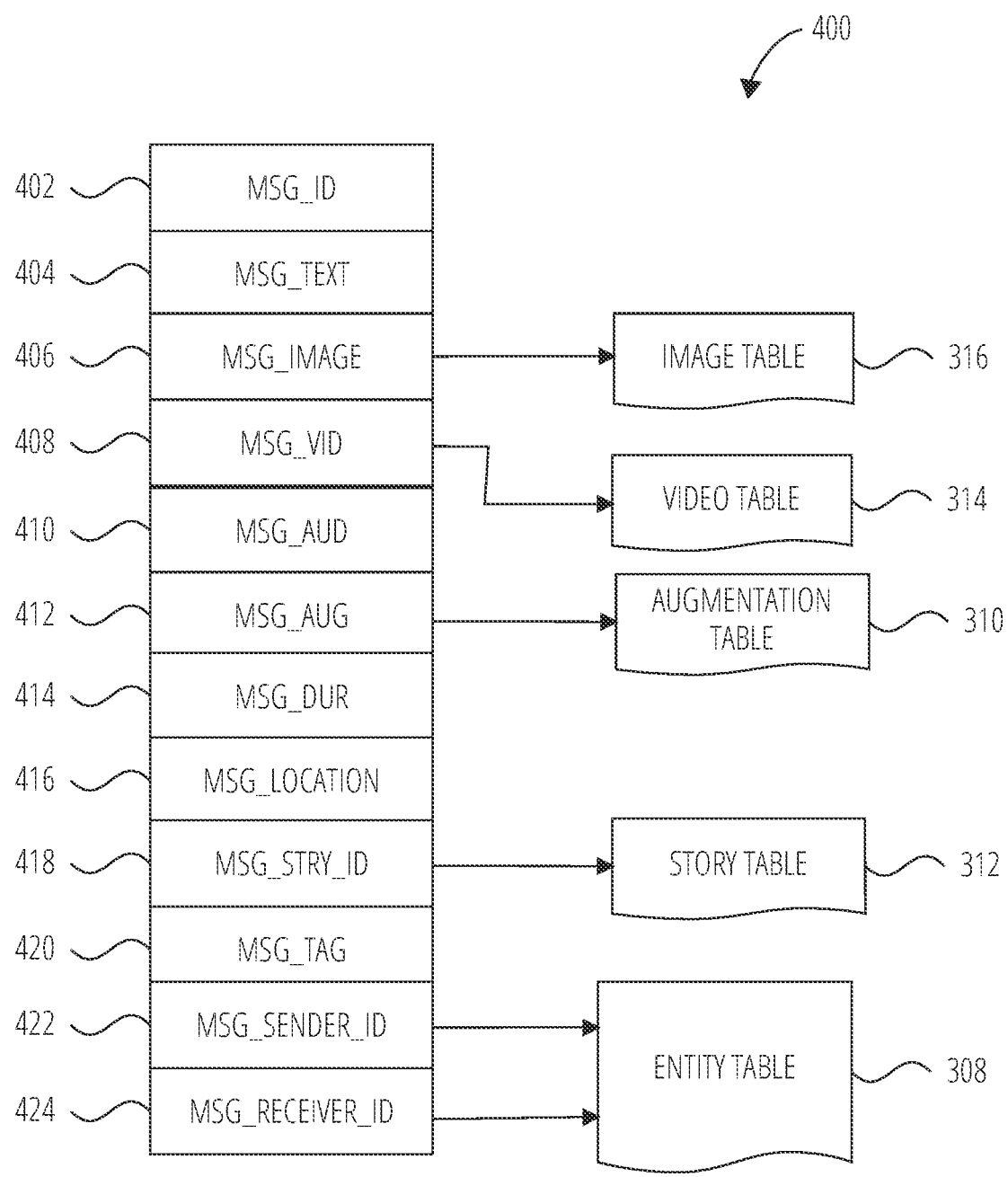
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
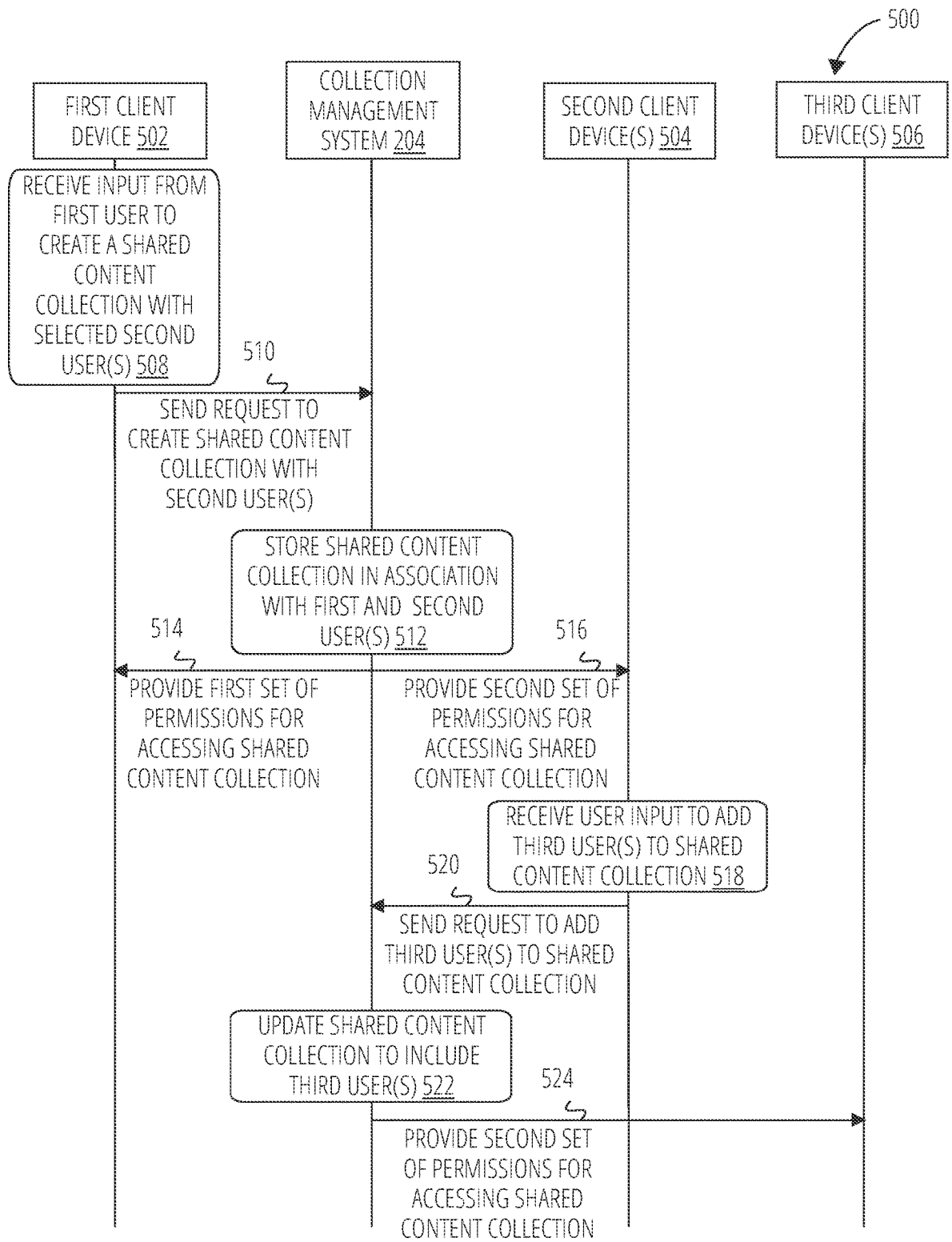
FIG. 5 is an interaction diagram illustrating a process for providing shared content collections within a messaging system, in accordance with some examples.

FIG. 5 is an interaction diagram illustrating a process 500 for providing shared content collections within a messaging system, in accordance with some examples. For explanatory purposes, the process 500 is primarily described herein with reference to the messaging client 104 of FIG. 1 and the collection management system 204 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In some embodiments, each of the first client device 502, the second client device(s) 504 and the third client device(s) 506 have instances of the messaging client 104 installed thereon. The first client device 502, second client device(s) 504 and third client device(s) 506 are associated with a respective first user, second user(s) and third user(s) of the messaging server system 108. For example, the first user is associated with a first user account of the messaging server system 108, each of the second user(s) is associated with respective second user account(s) of the messaging server system 108, and each of the third user(s) is associated with respective third user account(s) of the messaging server system 108.

As noted above, the first user, second user(s) and third users are identified by the messaging server system 108 based on unique identifiers (e.g., a messaging system identifier, email address and/or a device identifier) associated with respective user accounts for the first user, second user(s) and third user(s). In some embodiments, the messaging server system 108 implements and/or works in conjunction with a social network server 124 which is configured to identify other users (e.g., friends) with which a particular user has relationships.

As noted above, the collection management system 204 may correspond to a subsystem of the messaging system 100, and may be supported on the client side by the messaging client 104 and/or on the server side by the application servers 114. Thus, the operations described herein with respect to the collection management system 204 may be implemented client side, server side and/or a combination of client side and server side.

As described herein, the collection management system 204 is configured to provide for the first user to create a content collection including one or more media content items. The collection management system 204 further provides for the first user to share the content collection with one or more second user(s) selected by the first user. In this way, each of the first user and second user(s) are associated with the content collection. By virtue of being associated with the content collection, each of the first and second user(s) is able to view the content collection, and to add content (e.g., additional media content items) to the content collection. In addition, each of the first user and second user(s) is permitted to share the content collection with one or more selected third user(s).

The collection management system 204 may provide the first user, who initially created and shared the content collection, with different permissions for accessing the content collection relative to the permissions provided to the second user(s) and third user(s). For example, all associated users are permitted to share the content collection with additional users, to add media content to the content collection, and to view the content collection. However, the first user may be further permitted to delete the content collection, rename the content collection and remove users associated with the content collection.

At block 508, the messaging client 104 running on the first client device 502 receives input from the first user, to create a shared content collection for one or more second user(s) selected by the first user. For example, the collection management system 204 provides different interfaces from which the first user can create a shared content collection, including a user profile interface and a send interface.

The user profile interface is a user-selectable interface provided by the messaging client 104 running on the first client device 502, and corresponds to the above-described self profile (e.g., "my profile" of the first user). The self profile for the first user is based on profile data as maintained by the profile system 214 in conjunction with the profile data 302. For example, the self profile may indicate one or more of the user name, telephone number, address, settings (e.g., notification and privacy settings), a list of friends (e.g., contacts) and/or a user-selected avatar representation (or collection of such avatar representations) for the first user.

As discussed below with respect to FIG. 6, the self profile further includes a user-selectable element to create a new content collection (e.g., a "new story" button). In response to user selection of this element, the collection management system 204 provides a user-selectable option on the messaging client 104 running on the first client device 502, from which the first user may select to create the new content collection as either private or shared (e.g., as discussed below with respect to FIG. 7). In a case where the first user selects to create the new content collection as a shared collection, the collection management system 204 provides for the first user to select the one or more second user(s) to share the content collection with (e.g., as discussed below with respect to FIG. 8). The one or more second user(s) may be individually selectable from among the contacts (e.g., friends) of the first user. After the one or more second user(s) are selected, the collection management system 204 provides interface elements for the first user to select/create the content collection.

In one example, the messaging client 104 (in conjunction with the collection management system 204) provides the first user with interface element(s) for selecting previously-stored media content item(s) to include in the content collection. The media content item(s) may be selected from a library. For example, the library may be associated with the user account of the user, and may include media content items (which includes image, video and/or annotations) and/or prior content collections that were previously generated and saved by the user (e.g., in the database 126).

In another example, the messaging client 104 (in conjunction with the collection management system 204) provides an interface elements to generate a content collection using one or more newly-created media content items. In response to user selection of such interface elements, the messaging client 104 launches the device camera, which may correspond to a front-facing camera (e.g., for capturing image/video which depicts the user's face), or to a rear-facing camera (e.g., for capturing image/video of another object, scenery of the like). The captured image/video, together with any annotations, overlays, augmented reality content and the like, is used to generate the media content item(s) for adding to the shared content collection.

As noted above, the send interface provides an alternate manner by which the first user can create a shared content collection. For example, upon activation, the messaging client 104 may automatically launch the device camera in association with an interface for generating a media content item. The interface may include a "send" button, which is selectable to direct to the send interface. The send interface includes various interface elements for sending the generated media content item to friends, saving the media content item, and/or broadcasting the media content item in association with a feed interface.

As discussed below with respect to FIG. 9, the send interface further includes a user-selectable element to create a content collection (e.g., a "new story" button) based on the generated media content item. In response to user selection of the "new story" button within the send interface, the collection management system 204 provides a user-selectable option on the messaging client 104 running on the first client device 502, from which the first user may select to create the new content collection as either private or shared (e.g., as discussed below with respect to FIG. 10). In a case where the first user selects to create the new content collection as a shared collection, the collection management system 204 provides for the first user to select the one or more second user(s) for sharing the content collection with.

Thus, the first client device 502 sends, to the collection management system 204, a request to create a shared content collection with the selected second user(s) (operation 510). In response, the collection management system 204 stores the shared content collection in association with the first user and the second user(s) (block 512).

For example, the collection management system 204 provides for storing the content collection, which includes a set of media content items, within the story table 312 of the databases 126. Storing the content collection in association with the first user and the second user(s) provides for the content collection to be accessible by the first and second user(s), and not accessible by other users who are not associated with (e.g., are not members of) the shared content collection.

As noted above, each of the first user and the second user(s) may view their respective self profiles from their respective first client device 502 and second client device(s) 504. The collection management system 204 may cause each respective device to display a user-selectable interface element corresponding to the shared content collection within a self profile (e.g., as discussed below with respect to FIG. 11). The interface element may include an icon indicating a content collection which is shared, and further indicate a number of times the content collection has been viewed by the members (e.g., first and second users) of the content collection.

In storing the associations between the content collection and the first and second user(s), the collection management system 204 may store an indication that the first user is a creator of the content collection (e.g., a user who initially created and shared the content collection). As discussed below with respect to FIGS. 12-14, the collection management system 204 may provide the first user with different permissions for accessing the content collection relative to the permissions provided to the second user(s). Thus, the collection management system 204 provides a first set of permissions for accessing the shared content collection to the first client device 502 (operation 514), and provides a second set of content permissions for accessing the shared content collection to the second client device(s) 504 (operation 516).

For example, the first and second sets of permissions allow all members of the content collection (e.g., the first and second user(s)) to share the content collection with additional users, to add media content (e.g., additional media content items) to the content collection, and to view the content collection. However, the first set of permissions further allows the first to delete the content collection (e.g., causing the collection management system 204 to delete the content collection and its media content items from the database 126, and to remove the shared content collection from the self profiles of the members), to rename the content collection, and to remove users associated with the content collection.

In one or more embodiments, in lieu of granting one of the second user(s) permission to delete the content collection in its entirety, the second set of permissions allows a second user to leave (e.g., be removed from) the shared content collection. For example, in response to user selection of an appropriate interface element presented on the corresponding second client device(s) 504, the collection management system 204 removes the association between the content collection and the second user (e.g., as stored within the story table 312), and removes any media content items added by the second user from the content collection (e.g., as stored within the story table 312).

In one or more embodiments, the first set of permissions allows the first user to user select to automatically save any media content added by the first user with respect to the content collection (e.g., in a library associated with a user account of the first user). In a similar manner, the second set of permissions allows the second user to select to automatically save any media content added by the second user with respect to the content collection (e.g., in a library associated with a user account of the second user).

In the example of FIG. 5, one of the second client device(s) 504 receives user input, from a corresponding one of the second user(s), to add one or more third user(s) selected by the second user (block 518). That second client device sends, to the collection management system 204, a request to add the third user(s) to the shared content collection (operation 520). In response, the collection management system 204 updates the shared content collection (e.g., via the story table 312) to include the third user(s) (block 522).

For example, the selected one or more third user(s) correspond to contact(s) of the second user within the messaging server system 108. It is possible, but not a requirement of the collection management system 204, for the first user to be an existing contact of the third user(s). As such, it is possible for any of the one or more third user(s) to not be an existing contact of the first user. In cases where the first user is not a contact of one or more of the third user(s), the collection management system 204 is configured to provide an interface element on the appropriate third client device(s) 506, for adding the first user as a contact. Such an interface element may be presented on the third client device(s) 506 in association with viewing the shared content collection (e.g., as discussed below with respect to FIG. 16).

The collection management system 204 provides, for the third client device(s) 506, the second set of permissions for accessing the shared content collection (operation 524). As noted above, the second set of content permissions is more restrictive than the first set of content permissions provided to the first user. As such, the access permissions for the third user(s) are similar to those for the second user(s). However, the third user(s) have more restricted access relative to the first user, with respect to the shared content collection.

While not shown in the example of FIG. 5, one of the third user(s) may opt to add one or more fourth user(s) to the members of the shared content collection. The added fourth user(s) are also granted the second set of permissions for accessing the shared content collection. In one or more embodiments, the collection management system 204 may have a predefined cap of members (e.g., a maximum number such as 15,000 members) for the shared content collection. The predefined number may be set by an administrator of the messaging system 100. In a case where the predefined cap is reached, the collection management system 204 prohibits adding additional members to the shared content collection.

Regarding viewing, the collection management system 204 provides for any of the members to view the shared content collection. The shared content collection may be represented as a selectable tile within a content feed provided by the collection management system 204.

In one or more embodiments, the messaging system 100 provides multiple types of content feeds for viewing. The messaging client 104 in conjunction with the messaging server system 108 provides for an end user, at any of the client devices 502-506, to switch between different interfaces (e.g., switching between a first tab and a second tab via respective swipe gestures) for presenting content feeds and/or media content items.

The first tab may correspond with viewing content collections (e.g., stories), with each content collection including one or more media content items. A content feed may correspond to a set of content collections for particular types of entities. In one or more embodiments, a first content feed of the first tab is associated with friends of a user, a second content feed is associated with content provided by publishers to which the end user subscribes, and a third content feed is associated with content provided by publishers to which the end user does not subscribe. As noted above, the profile system 214 may implement various functions for maintaining profiles for friends and publishers (e.g., which may be subscription based or non-subscription based with respect an end user).

Each of the content feeds may be presented within separate sections within the first tab (e.g., as discussed below with respect to FIG. 15). For example, the first content feed includes content collections which are categorized under a "friends" section (e.g., header). A shared content collection may be included within the first content feed, and categorized within the "friends" section of the first tab. The first content feed may also include private content collections.

On the other hand, the second content feed includes content collections which are categorized under a "subscriptions" section. In addition, the third content feed includes content collections which are categorized under a non-subscription (e.g., "for you") section.

In this regard, the messaging client 104 presents each content collection (e.g., story) within the first tab as an individual icon (e.g., tile). For example, each of the "friends" section, the "subscriptions" section, and the "for you" section may include a set of respective tiles, each tile being selectable by the end user. Each tile may include one or more of a thumbnail with a representative image corresponding to the content collection (e.g., for a particular friend or publisher), a title of the content collection, and/or the entity (e.g., identity of the friend or publisher) associated with the content collection. User selection of the tile causes the messaging client 104 to display the content collection corresponding to the selected tile.

In one or more embodiments, the tiles for a particular content feed are displayed in a ranked order. The ranking for the tiles (e.g., content collections) may be based on metadata stored by the collection management system 204 in association with each content collection. Such metadata may indicate if a given content collection has been viewed by the end user, when the content collection was generated (e.g., based on timestamps), the popularity of the content collection, and the like.

The second tab (not shown) may correspond with viewing individual media content items submitted by different entities (e.g., creators, publishers, and the like). In one or more embodiments, the messaging system 100 may automatically select media content items for including in the second interface based on overall user popularity. User popularity for a media content item may be based on one or more of a number of system-wide views, user-submitted comments, user-submitted endorsements, and the like.

Thus, the messaging system 100 provides that different entities may provide content feeds that are selectable for viewing by an end user. Content feeds (e.g., sets of content collections) associated with friends of a user, publishers to which the end user subscribes, and publishers to which the end user does not subscribe may be accessible within respective sections of the first tab. A separate content feed is included in a second tab, and may include popular media content items associated with publishers, creators and the like. Moreover, as noted above, the profile system 214 in conjunction with profile data 302 provides for accessing friend profiles and/or public profiles.

As discussed below with respect to FIG. 15, a user (e.g., at any of the client devices 502-506) wishing view a shared content collection may select the corresponding tile within the "friends" section of first tab. In response, the collection management system 204 provides for display of the shared content collection (e.g., as discussed below with respect to FIG. 16). The interface for provides the user with options to perform with respect to the displayed content collection, such as adding members, saving, auto-saving, seeing viewers (e.g., as discussed below with respect to FIG. 17), and adding to the shared content collection.

Thus, the collection management system 204 as described herein provides for a first user to create a content collection for sharing with one or more second user(s), who can in turn share the content collection with additional third user(s). In addition, the collection management system 204 provides the first user, who created the content collection, with more permissions for accessing the content collection relative to the permissions provided to the second user(s) and third user(s). By virtue of providing shared content collections in this manner, it is possible to increase the visibility of particular content collections and to increase user engagement with respect to content feeds. Without providing for content collections which can be shared in this manner, end users may be limited in viewing media content and/or may perform workarounds (e.g., locally saving a content collection, and redistributing it) which are inefficient and may not as easily indicate attribution to the original creator of the content collection. As such, the messaging system 100 saves time for the user, reduces computational resources/processing power associated with having to perform workarounds, and/or improves attributing media content to creators. Moreover, the sharing of content collections as described herein may be more engaging for users of the messaging system 100.

Figure 6:
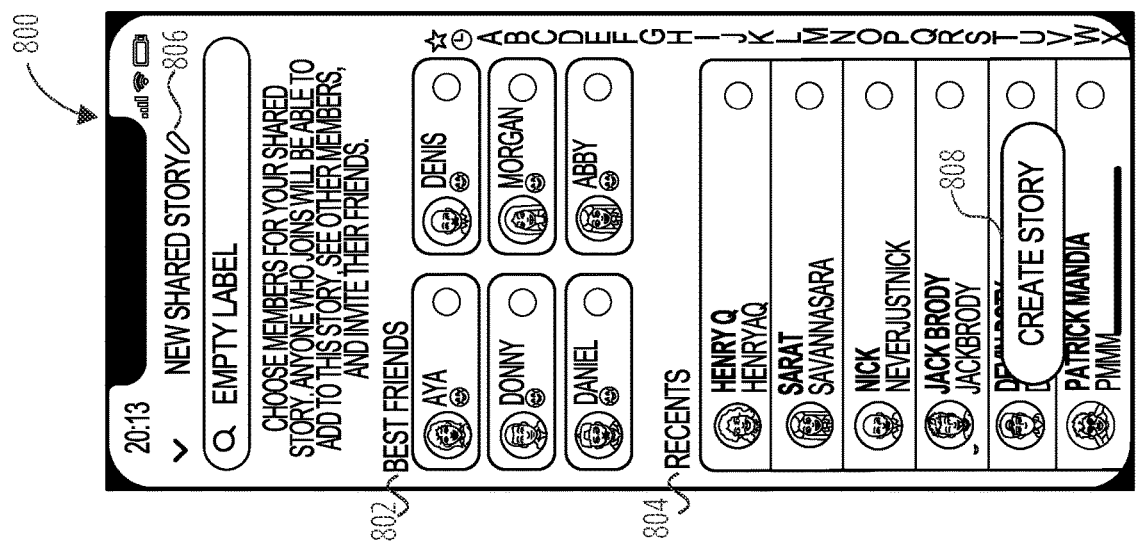
FIG. 6 illustrates an example user interface corresponding to a user profile, including an interface element for creating a content collection, in accordance with some examples.

FIG. 6 illustrates an example user interface 600 corresponding to a user profile, including an interface element for creating a content collection, in accordance with some examples. The user interface 600 includes a content collections section 602, a friends and groups section 604, an avatar section 606 and a new content collection button 608.

The user interface 600 corresponds to a self profile (e.g., of a first user) creating a shared content collection. As noted above, the self profile for the first user is based on profile data as maintained by the profile system 214 in conjunction with the profile data 302. The self profile indicates the user name and other identifying information of the user. The content collections section 602 lists private and shared content collections associated with the first user. The friends and groups section 604 indicates friends and groups of the first user (e.g., represented by collapsible friend entries and group entries, each of which are user-selectable to redirect to a respective friend profile or group profile), and the avatar section 606 provides interface elements for viewing and/or editing avatar(s) associated with the self profile of the first user.

The user interface 600 further includes a new content collection button 608, which is selectable by the first user to create a new content collection. The new content collection may be created as private or shared, as discussed below with respect to FIG. 7.

Figure 7:
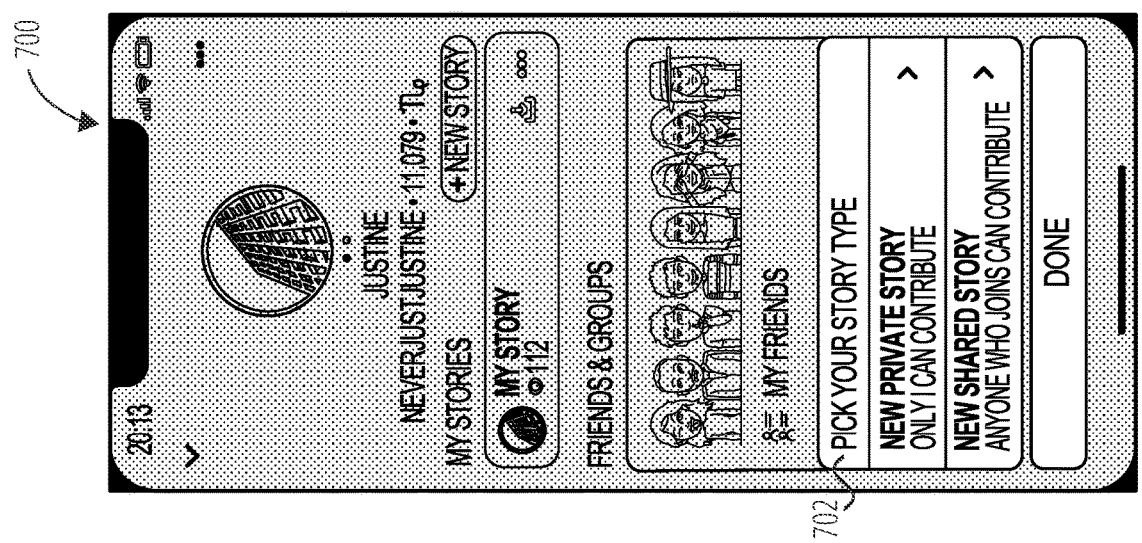
FIG. 7 illustrates an example user interface for selecting between creating a private content collection or a shared content collection, in accordance with some examples.

FIG. 7 illustrates an example user interface 700 for selecting between creating a private content collection or a shared content collection, in accordance with some examples. The user interface 700 includes new content collection options 702, which is presented as an overlay with respect to the user interface 600 of FIG. 6.

As shown the example of FIG. 7, the user interface 700 includes user-selectable options to create a content collection as either private or shared. In the example of FIG. 7, the first user selects to create a shared content collection by selecting the "new shared story" option depicted in FIG. 7, thereby redirecting the messaging client 104 to the interface of FIG. 8.

Figure 8:
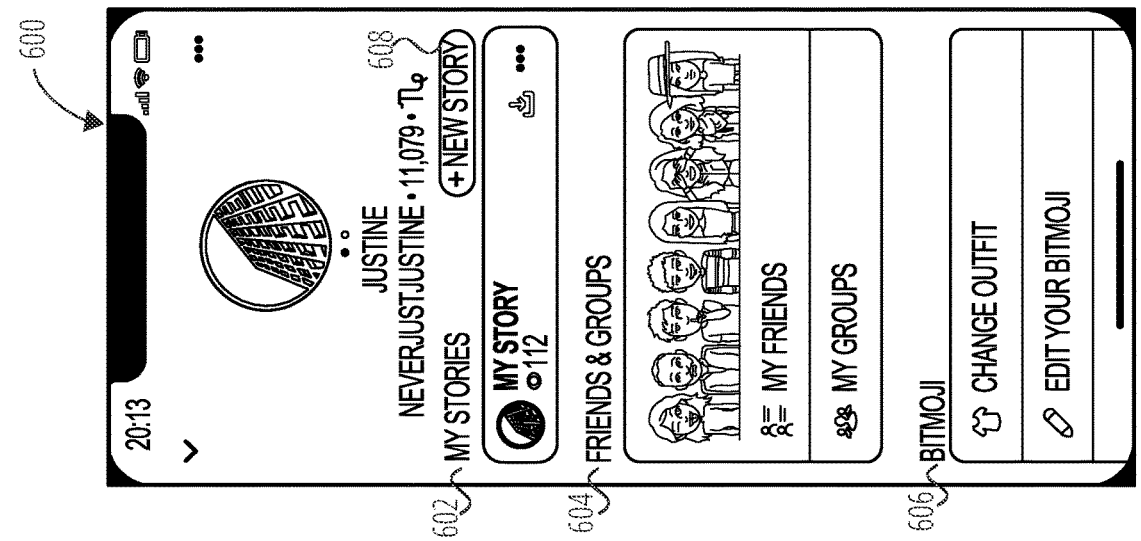
FIG. 8 illustrates an example user interface for selecting users to associate with a shared content collection, in accordance with some examples.

FIG. 8 illustrates an example user interface 800 for selecting users to associate with a shared content collection, in accordance with some examples. The user interface 800 allows for the first user to select friends (e.g., the above-described second user(s)) to share the content collection with.

For example, the first user may select the second user(s) via a best friends section 802, which is populated based at least in part on message frequency between users and/or user-specified designation of "best" (e.g., closest) friends. Selectable friends may also be presented based on recent contact (e.g., recent messaging, calls or other communication) between the users within the recent friends section 804. In addition, the user interface 800 allows for searching and scrolling through all friends (e.g., contacts) of the first user in order to select the second user(s).

The user interface 800 further includes a content collection name section 806, for setting a name for the shared content collection. The name may be set by the first user via selection of an edit icon (e.g., a pencil icon). In one or more embodiments, the collection management system 204 is configured to prohibit use of certain names via a blacklist (e.g., stored in the database 126). For example, the blacklist includes predefined names and/or terms which are not permitted with respect to setting a name. The first user may confirm creation of the shared story, for example, by selecting the create story button 808. Selection of the create story button 808 may prompt the first user to confirm the name of the shared content collection (e.g., where the name may default to a predefined name of "<first user name>'s shared story").

Figure 9:
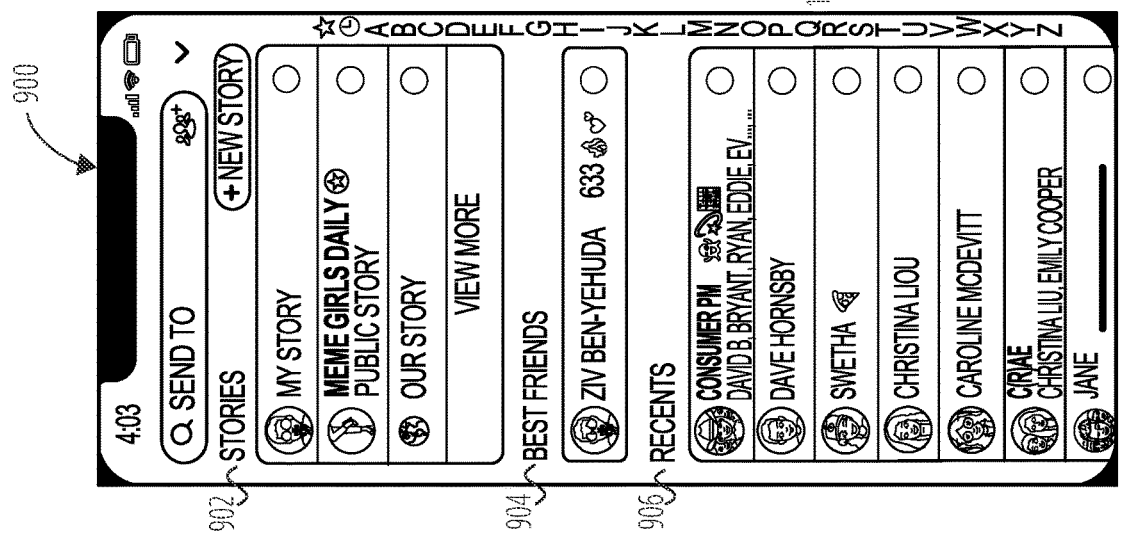
FIG. 9 illustrates an example user interface for sending message content, including an interface element for creating a content collection, in accordance with some examples.

FIG. 9 illustrates an example user interface 900 for sending message content, including an interface element for creating a content collection, in accordance with some examples. The user interface 900 includes a content collections section 902, a best friends section 904, a recent friends section 906 and a new content collection button 908.

The user interface 900 corresponds to a send interface, for example, as discussed above with respect to FIG. 5. The send interface is surfaced in response to user selection of a "send button" following image capture to generate media content item(s). The user interface 900 provides different options with respect to sending (or saving) media content item(s) For example, the first user may select to save the media content item(s) in association with available content collections (e.g., stories) listed in the content collections section 902. Alternatively or in addition, the first user may select to send the media content item(s) to friends selected via the best friends section 904 or the recent friends section 906.

In addition, the first user may create a new content collection based on the media content item(s). As shown, the new content collection button 908 is selectable by the first user to create the new content collection using the media content item(s). The new content collection may be created as private or shared, as discussed below with respect to FIG. 10.

Figure 10:
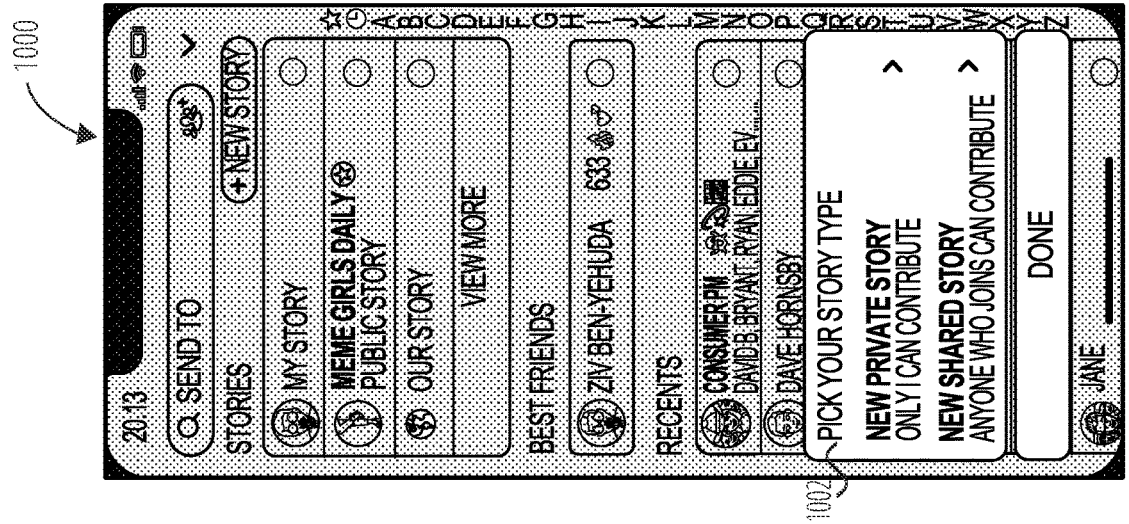
FIG. 10 illustrates an example user interface for selecting between creating a private content collection or a shared content collection, in accordance with some examples.

FIG. 10 illustrates an example user interface 1000 for selecting between creating a private content collection or a shared content collection, in accordance with some examples. The user interface 1000 includes new content collection options 1002, which is presented as an overlay with respect to the user interface 900 of FIG. 9.

As shown the example of FIG. 10, the user interface 1000 includes user-selectable options to create a content collection as either private or shared. In the example of FIG. 10, the first user selects to create a shared content collection by selecting the "new shared story" option depicted in FIG. 10, which in turn may redirect to a user interface for selecting the one or more second user(s) (e.g., similar to the user interface 800 of FIG. 8).

Figure 11:
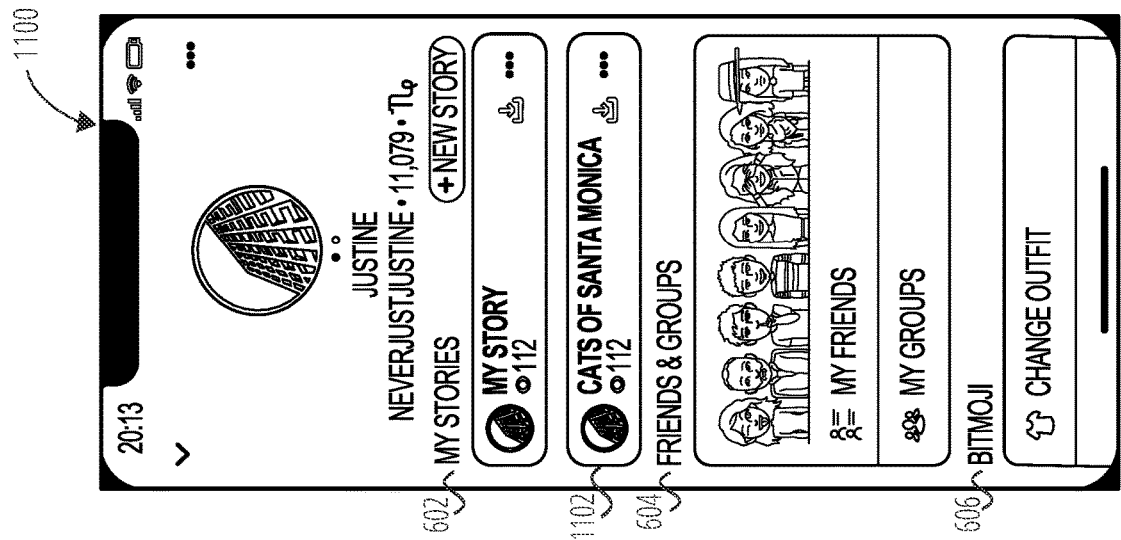
FIG. 11 illustrates an example user interface corresponding to a user profile of a creating user of a shared content collection, in accordance with some examples.

FIG. 11 illustrates an example user interface 1100 corresponding to a user profile of a creating user of a shared content collection, in accordance with some examples. The user interface 1100 corresponds to the self profile of a first user as depicted in FIG. 6, but updated to indicate the created shared content collection (e.g., via the new content collection options 702 and/or the new content collection options 1002).

The created shared content collection is represented within the content collections section 602, as a separate shared content collection entry 1102. The shared content collection entry 1102 indicates the name of the content collection (e.g., "cats of Santa Monica") as set by the first user. In the example of FIG. 11, the shared content collection entry 1102 indicates that the content collection is shared (e.g., per corresponding shared icon within the entry). The shared content collection entry 1102 further indicates a number of views (e.g., by members of the shared content collection). The shared content collection entry 1102 is user-selectable by the first user to view the corresponding shared content collection.

FIG. 12 illustrates an example user interface 1200 indicating a set of permissions available to a creating user of a shared content collection, in accordance with some examples. For example, the creating user corresponds to the first user as described herein. The user interface 1200 includes shared content collection options 1202, which is presented as an overlay with respect to the user interface 1100 of FIG. 11. The shared content collection options 1202 may be surfaced in response to the first user selecting a more option (e.g., ellipsis icon) depicted within the shared content collection entry 1102 of FIG. 11.

As shown the example of FIG. 12, the user interface 1200 includes user-selectable options corresponding to the first set of permissions as discussed above with respect to FIG. 5. The user-selectable options allow for the first user to: delete the content collection (e.g., "delete story"), rename the content collection (e.g., "rename story"), add or remove users associated with the content collection (e.g., "edit members"), save the content collection (e.g., "save story"), toggle auto-saving of the content collection (e.g., "auto-save to memories"), and add media content to the content collection (e.g., "add to story").

In the example of FIG. 12, the first user selects to add or remove users associated with the content collection, by selecting the "edit members" option depicted in FIG. 12, thereby redirecting to the user interface of FIG. 13.

FIG. 13 illustrates an example user interface 1300 presented to a creating user of a shared content collection, for editing member users of the shared content collection, in accordance with some examples. The user interface 1300 includes a current members section 1302 listing the users currently associated with the shared content collection (e.g., the second user(s) selected by the first user). The individual member entries within the current members section 1302 are user-selectable for deletion by the first user. The first user may select to share the content collection with additional users, for example, by selecting from among those listed within the recent friends section 1304 and/or those searchable or scrollable by corresponding elements within the current members section 1302.

FIG. 14 illustrates an example user interface 1400 indicating a set of permissions available to a member user of a shared content collection, in accordance with some examples. For example, the member user corresponds to any of the second user(s) or third user(s) as described herein. The user interface 1400 includes shared content collection options 1402, which is presented as an overlay with respect to a self profile of the member (e.g., one of the second or third users). The user interface 1400 may be surfaced in response to the member selecting a more option (e.g., ellipsis icon) depicted within a shared content collection entry of the member's self profile.

As shown the example of FIG. 14, the user interface 1400 includes user-selectable options corresponding to the second set of permissions as discussed above with respect to FIG. 5. The user-selectable options allow for the member to: leave the content collection (e.g., "leave story"), view and add users associated with the content collection (e.g., "see members"), view the self profile (e.g., "view profile"), toggle auto-saving of the content collection (e.g., "auto-save to memories"), and add media content to the content collection (e.g., "add to story"). The second set of permissions further allows for the member user to view the shared content collection, for example, by user selection of the shared content collection entry in the self profile of the member user.

Figure 15:
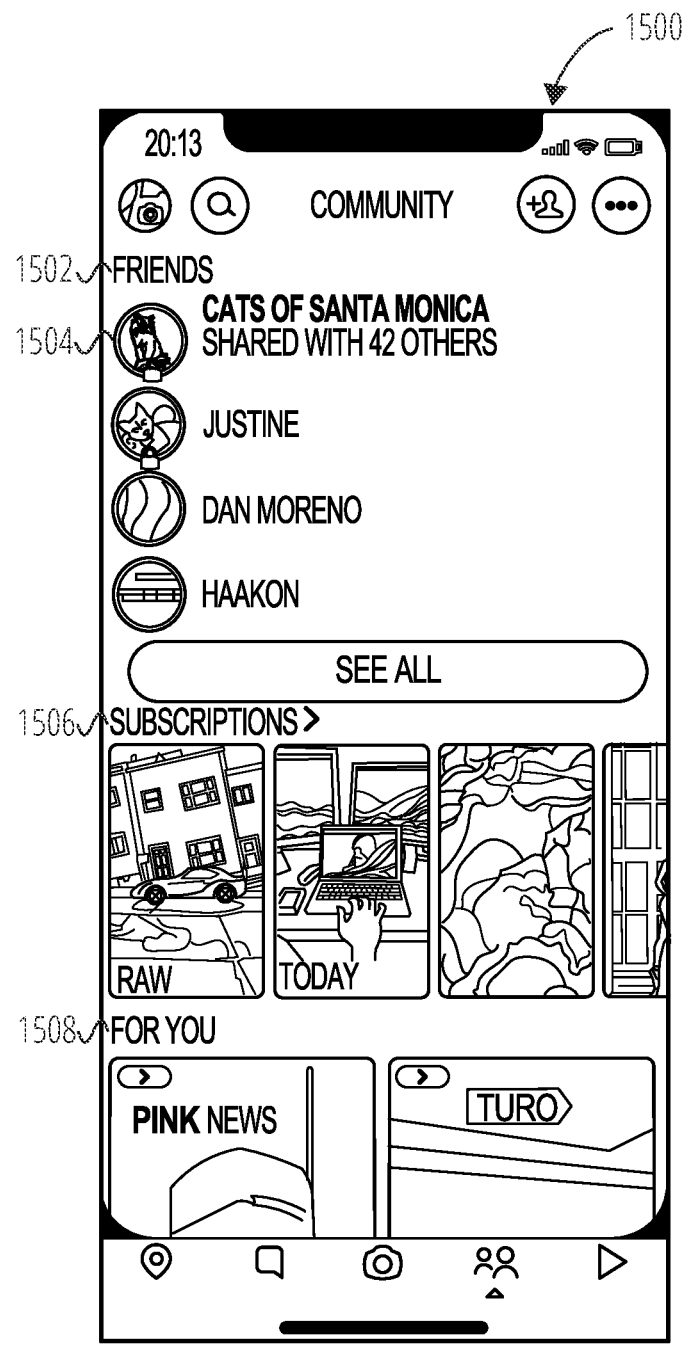
FIG. 15 illustrates an example user interface for selecting to view a shared content collection, in accordance with some examples.

FIG. 15 illustrates an example user interface 1500 for selecting to view a shared content collection, in accordance with some examples. As noted above with respect to FIG. 5, the messaging system 100 provides for first, second and third content feeds to be presented within separate sections of a first tab of the messaging client 104. The user interface 1500 provides for the first content feed (e.g., associated with friends of a user) within a friends section 1502, the second content feed (e.g., associated with content provided by publishers to which the end user subscribes) within a subscription section 1506, and the third content feed (e.g., associated with content provided by publishers to which the end user does not subscribe) within a non-subscription section 1508.

In the example of FIG. 15, the friends section 1502 includes a shared content collection entry 1504, which is user selectable (e.g., by members of the corresponding shared content collection) for viewing. The shared content collection entry 1504 indicates the number of members for the shared content collection (e.g., "shard with 42 others").

Figure 16:
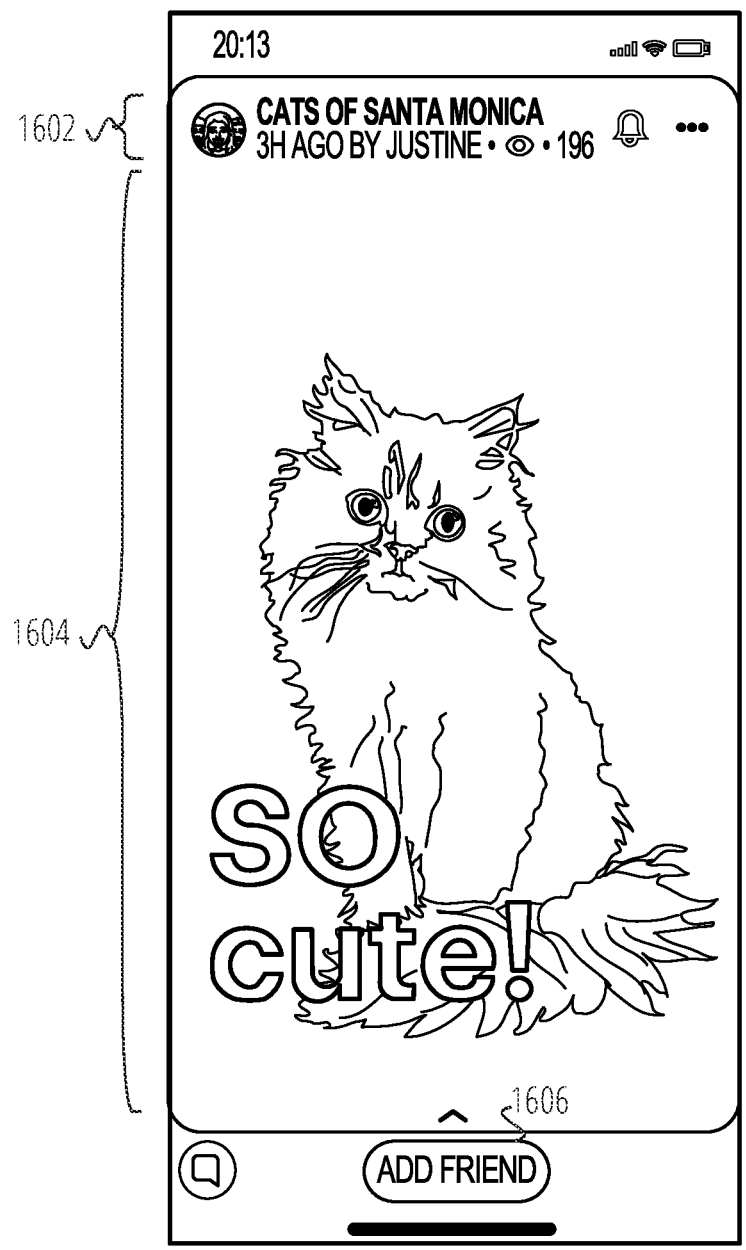
FIG. 16 illustrates an example user interface for viewing a shared content collection, in accordance with some examples.

FIG. 16 illustrates an example user interface 1600 for viewing a shared content collection, in accordance with some examples. For example, the user interface 1600 is presented in response to user selection of the shared content collection entry 1504 in FIG. 15 and/or user selection of the shared content collection entry 1102 in FIG. 11.

The user interface 1600 includes a header 1602 which indicates the name of the shared content collection (e.g., "cats of Santa Monica"), the creator of the shared content collection, a time of creation, an icon indicating that the content collection is shared, and a number of times that the shared content collection has been viewed.

The user interface 1600 also displays a current media content 1604 being displayed with respect to the shared content collection. As noted above, the content collection may include multiple media content items, which may be cycled through in chronological order based on a predefined schedule and/or based on user input (e.g., clicks, swipes) to advance or reverse through the media content items.

As noted above, in a case where the creator (e.g., the first user) of the content collection is not yet a contact of the viewing user (e.g., the third user), the collection management system 204 provides an interface element (e.g., an add contact button 1606) for the third user to add the first user as a contact. In a case where the creator is already a contact of the viewing user, the collection management system 204 may instead provide an interface element (not shown) to surface a reply interface, by which the viewing user may generate a reply to the creator with respect to the shared content collection.

In addition, user selection of the more options button 1608 (e.g., depicted as an ellipsis) causes the collection management system 204 to present additional options, for example, as an overlay (not shown) of the user interface 1600. For example, the additional options allow the viewing user (e.g., member) to leave the content collection, save the content collection, auto-save the content collection, see viewers of the content collection, and add media content to the content collection, for example as discussed above.

In the example of FIG. 16, the viewing user selects to see viewers of the shared content collection within the overlay. This option is available to all members of the content collection, including the creator.

Figure 17:
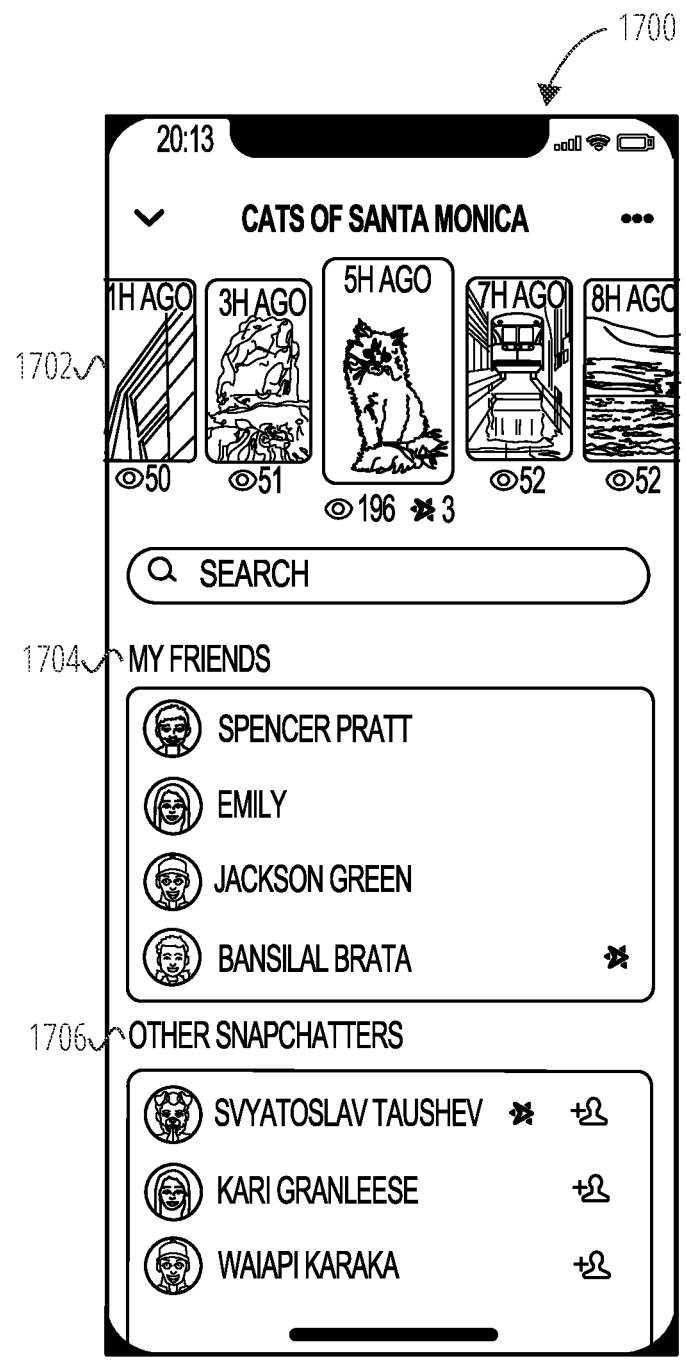
FIG. 17 illustrates an example user interface for presenting a list of users who have viewed a shared content collection, in accordance with some examples.

FIG. 17 illustrates an example user interface 1700 for presenting a list of users who have viewed a shared content collection, in accordance with some examples. For example, user interface 1700 is surfaced in response to user selection to see viewers as described above with respect to FIG. 16.

The user interface 1700 indicates the media content items 1702 included within the shared content collection, for example, as individual user-selectable tiles for playback. The user interface 1700 further includes a friends section 1704 which lists the friends of the viewing user, who are members of the shared content collection, and who have viewed the shared content collection. In addition, the user interface 1700 includes a non-contacts section 1706 which lists users who are members and have viewed the shared content collection, but are not contacts of the viewing user. Each non-contact is presented with an interface element (e.g., a "+" icon), which is user-selectable by the viewing user, to add that viewing member as a contact of the viewing user. In addition, each of the individual entries within the friends section 1704 and the non-contacts section 1706 is user-selectable to surface the user profile for that viewing member of the shared content collection.

Figure 18:
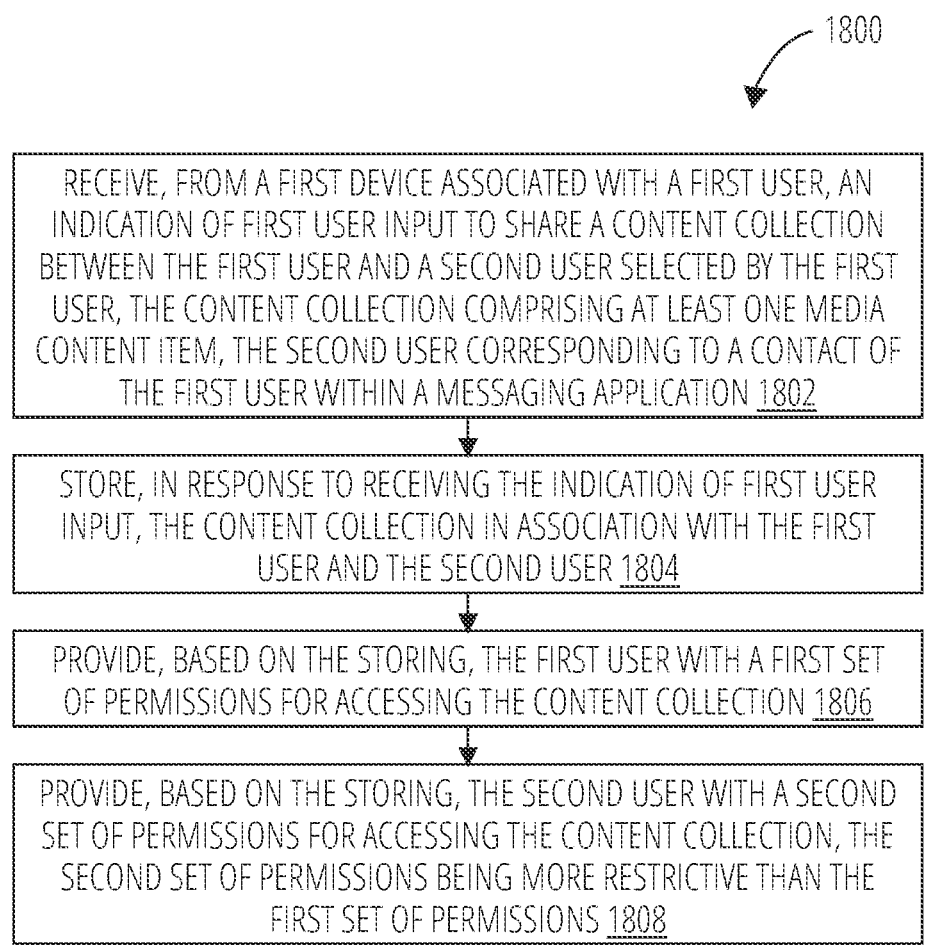
FIG. 18 is a flowchart illustrating a process for providing permissions for accessing shared content collections, in accordance with some examples.

FIG. 18 is a flowchart illustrating a process 1800 for providing permissions for accessing shared content collections, in accordance with some examples. For explanatory purposes, the process 1800 is primarily described herein with reference to the collection management system 204 of FIG. 1. However, one or more blocks (or operations) of the process 1800 may be performed by one or more other components, and/or by other suitable devices. Further for explanatory purposes, the blocks (or operations) of the process 1800 are described herein as occurring in serial, or linearly. However, multiple blocks (or operations) of the process 1800 may occur in parallel or concurrently. In addition, the blocks (or operations) of the process 1800 need not be performed in the order shown and/or one or more blocks (or operations) of the process 1800 need not be performed and/or can be replaced by other operations. The process 1800 may be terminated when its operations are completed. In addition, the process 1800 may correspond to a method, a procedure, an algorithm, etc.

The collection management system 204 receives, from a first device associated with a first user, an indication of first user input to share a content collection between the first user and a second user selected by the first user, the content collection comprising at least one media content item, the second user corresponding to a contact of the first user within a messaging application (block 1802). The content collection may be created by the first user via the first device.

The collection management system 204 stores, in response to receiving the indication of first user input, the content collection in association with the first user and the second user (block 1804).

The collection management system 204 provides, based on the storing, the first user with a first set of permissions for accessing the content collection (block 1806). The first set of permissions may authorize the first user to delete the content collection, rename the content collection, add or remove users associated with the content collection, save the content collection, add media content to the content collection, and view the content collection. The first set of permissions may include a user-selectable option to automatically save any media content added by the first user with respect to the content collection.

The collection management system 204 provides, based on the storing, the second user with a second set of permissions for accessing the content collection, the second set of permissions being more restrictive than the first set of permissions (block 1808). The second set of permissions may authorize the second user to leave the content collection, add users associated with the content collection, add media content to the content collection, and view the content collection. Leaving the content collection may include removing the association between the content collection and the second user, and removing any media content added by the second user from the content collection. The second set of permissions may include a user-selectable option to automatically save any media content added by the second user with respect to the content collection.

Figure 19:
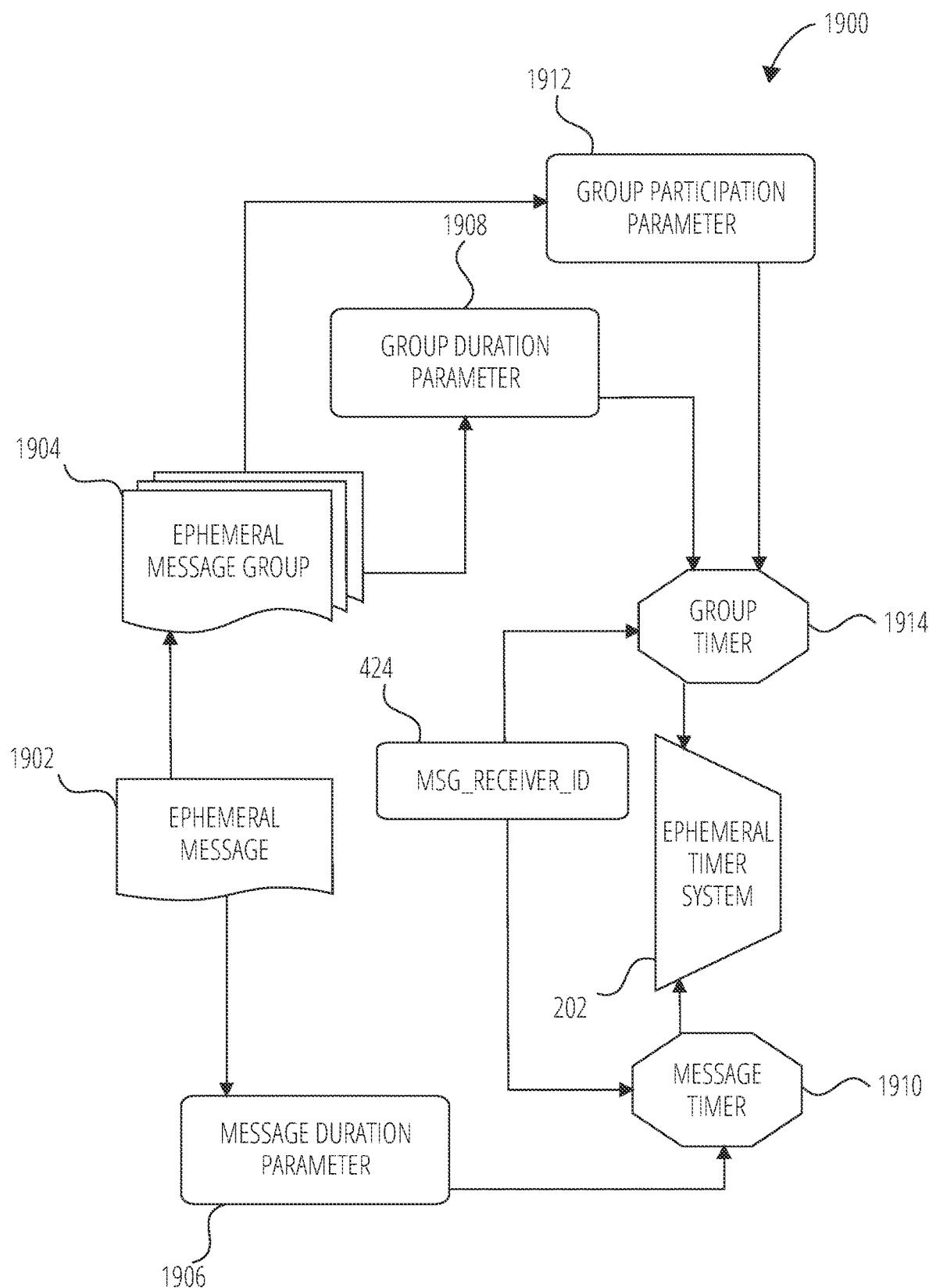
FIG. 19 is a flowchart for an access-limiting process, in accordance with some examples.

FIG. 19 is a schematic diagram illustrating an access-limiting process 1900, in terms of which access to content (e.g., an ephemeral message 1902, and associated multimedia payload of data) or a content collection (e.g., an ephemeral message group 1904) may be time-limited (e.g., made ephemeral).

An ephemeral message 1902 is shown to be associated with a message duration parameter 1906, the value of which determines an amount of time that the ephemeral message 1902 will be displayed to a receiving user of the ephemeral message 1902 by the messaging client 104. In one example, an ephemeral message 1902 is viewable by a receiving user for up to a maximum of 10 seconds, depending on the amount of time that the sending user specifies using the message duration parameter 1906.

The message duration parameter 1906 and the message receiver identifier 424 are shown to be inputs to a message timer 1910, which is responsible for determining the amount of time that the ephemeral message 1902 is shown to a particular receiving user identified by the message receiver identifier 424. In particular, the ephemeral message 1902 will only be shown to the relevant receiving user for a time period determined by the value of the message duration parameter 1906. The message timer 1910 is shown to provide output to a more generalized ephemeral timer system 202, which is responsible for the overall timing of display of content (e.g., an ephemeral message 1902) to a receiving user.

The ephemeral message 1902 is shown in FIG. 19 to be included within an ephemeral message group 1904 (e.g., a collection of messages in a personal story, or an event story). The ephemeral message group 1904 has an associated group duration parameter 1908, a value of which determines a time duration for which the ephemeral message group 1904 is presented and accessible to users of the messaging system 100. The group duration parameter 1908, for example, may be the duration of a music concert, where the ephemeral message group 1904 is a collection of content pertaining to that concert. Alternatively, a user (either the owning user or a curator user) may specify the value for the group duration parameter 1908 when performing the setup and creation of the ephemeral message group 1904.

Additionally, each ephemeral message 1902 within the ephemeral message group 1904 has an associated group participation parameter 1912, a value of which determines the duration of time for which the ephemeral message 1902 will be accessible within the context of the ephemeral message group 1904. Accordingly, a particular ephemeral message group 1904 may "expire" and become inaccessible within the context of the ephemeral message group 1904, prior to the ephemeral message group 1904 itself expiring in terms of the group duration parameter 1908. The group duration parameter 1908, group participation parameter 1912, and message receiver identifier 424 each provide input to a group timer 1914, which operationally determines, firstly, whether a particular ephemeral message 1902 of the ephemeral message group 1904 will be displayed to a particular receiving user and, if so, for how long. Note that the ephemeral message group 1904 is also aware of the identity of the particular receiving user as a result of the message receiver identifier 424.

Accordingly, the group timer 1914 operationally controls the overall lifespan of an associated ephemeral message group 1904, as well as an individual ephemeral message 1902 included in the ephemeral message group 1904. In one example, each and every ephemeral message 1902 within the ephemeral message group 1904 remains viewable and accessible for a time period specified by the group duration parameter 1908. In a further example, a certain ephemeral message 1902 may expire, within the context of ephemeral message group 1904, based on a group participation parameter 1912. Note that a message duration parameter 1906 may still determine the duration of time for which a particular ephemeral message 1902 is displayed to a receiving user, even within the context of the ephemeral message group 1904. Accordingly, the message duration parameter 1906 determines the duration of time that a particular ephemeral message 1902 is displayed to a receiving user, regardless of whether the receiving user is viewing that ephemeral message 1902 inside or outside the context of an ephemeral message group 1904.

The ephemeral timer system 202 may furthermore operationally remove a particular ephemeral message 1902 from the ephemeral message group 1904 based on a determination that it has exceeded an associated group participation parameter 1912. For example, when a sending user has established a group participation parameter 1912 of 24 hours from posting, the ephemeral timer system 202 will remove the relevant ephemeral message 1902 from the ephemeral message group 1904 after the specified 24 hours. The ephemeral timer system 202 also operates to remove an ephemeral message group 1904 when either the group participation parameter 1912 for each and every ephemeral message 1902 within the ephemeral message group 1904 has expired, or when the ephemeral message group 1904 itself has expired in terms of the group duration parameter 1908.

In certain use cases, a creator of a particular ephemeral message group 1904 may specify an indefinite group duration parameter 1908. In this case, the expiration of the group participation parameter 1912 for the last remaining ephemeral message 1902 within the ephemeral message group 1904 will determine when the ephemeral message group 1904 itself expires. In this case, a new ephemeral message 1902, added to the ephemeral message group 1904, with a new group participation parameter 1912, effectively extends the life of an ephemeral message group 1904 to equal the value of the group participation parameter 1912.

Responsive to the ephemeral timer system 202 determining that an ephemeral message group 1904 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1904 to no longer be displayed within a user interface of the messaging client 104. Similarly, when the ephemeral timer system 202 determines that the message duration parameter 1906 for a particular ephemeral message 1902 has expired, the ephemeral timer system 202 causes the messaging client 104 to no longer display an indicium (e.g., an icon or textual identification) associated with the ephemeral message 1902.

Figure 20:
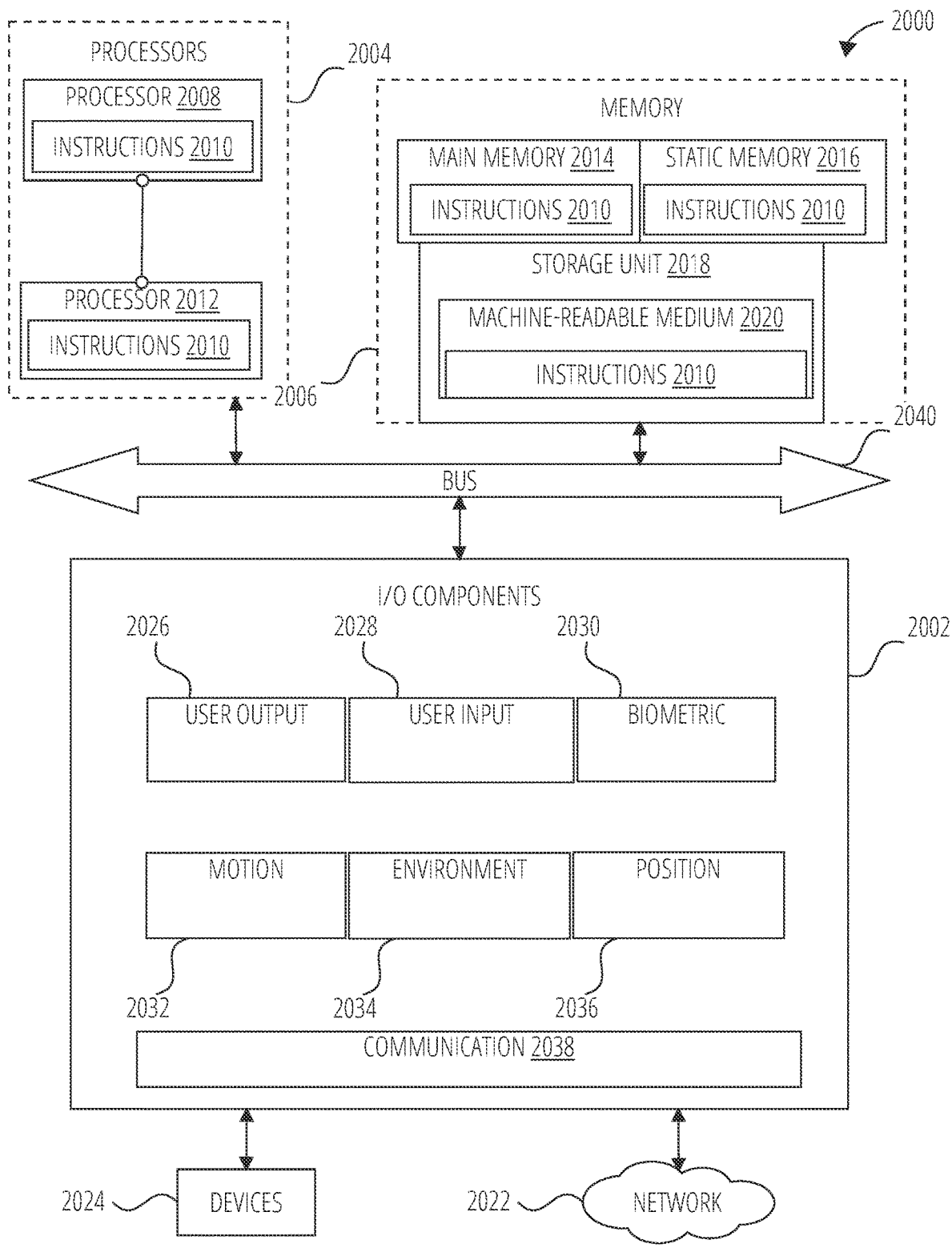
FIG. 20 is a diagrammatic representation of a machine in the form of a computer system within which a set of instructions may be executed for causing the machine to perform any one or more of the methodologies discussed herein, in accordance with some examples.

FIG. 20 is a diagrammatic representation of the machine 2000 within which instructions 2010 (e.g., software, a program, an application, an applet, an app, or other executable code) for causing the machine 2000 to perform any one or more of the methodologies discussed herein may be executed. For example, the instructions 2010 may cause the machine 2000 to execute any one or more of the methods described herein. The instructions 2010 transform the general, non-programmed machine 2000 into a particular machine 2000 programmed to carry out the described and illustrated functions in the manner described. The machine 2000 may operate as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2010, sequentially or otherwise, that specify actions to be taken by the machine 2000. Further, while only a single machine 2000 is illustrated, the term "machine" shall also be taken to include a collection of machines that individually or jointly execute the instructions 2010 to perform any one or more of the methodologies discussed herein. The machine 2000, for example, may comprise the client device 102 or any one of a number of server devices forming part of the messaging server system 108. In some examples, the machine 2000 may also comprise both client and server systems, with certain operations of a particular method or algorithm being performed on the server-side and with certain operations of the particular method or algorithm being performed on the client-side.

The machine 2000 may include processors 2004, memory 2006, and input/output I/O components 2002, which may be configured to communicate with each other via a bus 2040. In an example, the processors 2004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2008 and a processor 2012 that execute the instructions 2010. The term "processor" is intended to include multi-core processors that may comprise two or more independent processors (sometimes referred to as "cores") that may execute instructions contemporaneously. Although FIG. 20 shows multiple processors 2004, the machine 2000 may include a single processor with a single-core, a single processor with multiple cores (e.g., a multi-core processor), multiple processors with a single core, multiple processors with multiples cores, or any combination thereof.

The memory 2006 includes a main memory 2014, a static memory 2016, and a storage unit 2018, both accessible to the processors 2004 via the bus 2040. The main memory 2006, the static memory 2016, and storage unit 2018 store the instructions 2010 embodying any one or more of the methodologies or functions described herein. The instructions 2010 may also reside, completely or partially, within the main memory 2014, within the static memory 2016, within machine-readable medium 2020 within the storage unit 2018, within at least one of the processors 2004 (e.g., within the Processor's cache memory), or any suitable combination thereof, during execution thereof by the machine 2000.

The I/O components 2002 may include a wide variety of components to receive input, provide output, produce output, transmit information, exchange information, capture measurements, and so on. The specific I/O components 2002 that are included in a particular machine will depend on the type of machine. For example, portable machines such as mobile phones may include a touch input device or other such input mechanisms, while a headless server machine will likely not include such a touch input device. It will be appreciated that the I/O components 2002 may include many other components that are not shown in FIG. 20. In various examples, the I/O components 2002 may include user output components 2026 and user input components 2028. The user output components 2026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2002 may include biometric components 2030, motion components 2032, environmental components 2034, or position components 2036, among a wide array of other components. For example, the biometric components 2030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2032 include acceleration sensor components (e.g., accelerometer), gravitation sensor components, rotation sensor components (e.g., gyroscope).

The environmental components 2034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2002 further include communication components 2038 operable to couple the machine 2000 to a network 2022 or devices 2024 via respective coupling or connections. For example, the communication components 2038 may include a network interface Component or another suitable device to interface with the network 2022. In further examples, the communication components 2038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2024 may be another machine or any of a wide variety of peripheral devices (e.g., a peripheral device coupled via a USB).

Moreover, the communication components 2038 may detect identifiers or include components operable to detect identifiers. For example, the communication components 2038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2038, such as location via Internet Protocol (IP) geolocation, location via Wi-Fi® signal triangulation, location via detecting an NFC beacon signal that may indicate a particular location, and so forth.

The various memories (e.g., main memory 2014, static memory 2016, and memory of the processors 2004) and storage unit 2018 may store one or more sets of instructions and data structures (e.g., software) embodying or used by any one or more of the methodologies or functions described herein. These instructions (e.g., the instructions 2010), when executed by processors 2004, cause various operations to implement the disclosed examples.

The instructions 2010 may be transmitted or received over the network 2022, using a transmission medium, via a network interface device (e.g., a network interface component included in the communication components 2038) and using any one of several well-known transfer protocols (e.g., hypertext transfer protocol (HTTP)). Similarly, the instructions 2010 may be transmitted or received using a transmission medium via a coupling (e.g., a peer-to-peer coupling) to the devices 2024.

Figure 21:
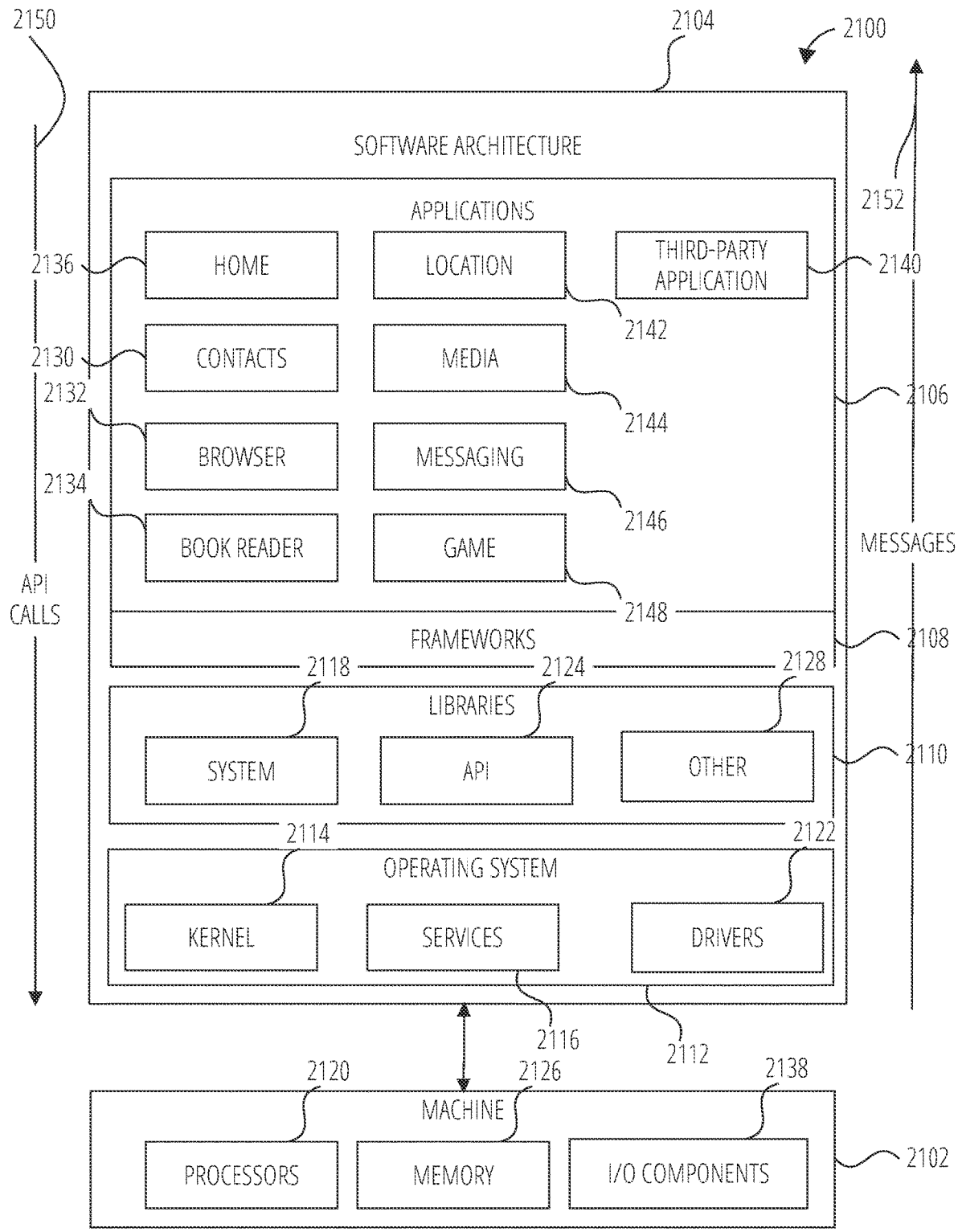
FIG. 21 is a block diagram showing a software architecture within which examples may be implemented.

FIG. 21 is a block diagram 2100 illustrating a software architecture 2104, which can be installed on any one or more of the devices described herein. The software architecture 2104 is supported by hardware such as a machine 2102 that includes processors 2120, memory 2126, and I/O components 2138. In this example, the software architecture 2104 can be conceptualized as a stack of layers, where each layer provides a particular functionality. The software architecture 2104 includes layers such as an operating system 2112, libraries 2110, frameworks 2108, and applications 2106. Operationally, the applications 2106 invoke API calls 2150 through the software stack and receive messages 2152 in response to the API calls 2150.

The operating system 2112 manages hardware resources and provides common services. The operating system 2112 includes, for example, a kernel 2114, services 2116, and drivers 2122. The kernel 2114 acts as an abstraction layer between the hardware and the other software layers. For example, the kernel 2114 provides memory management, processor management (e.g., scheduling), component management, networking, and security settings, among other functionality. The services 2116 can provide other common services for the other software layers. The drivers 2122 are responsible for controlling or interfacing with the underlying hardware. For instance, the drivers 2122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2110 provide a common low-level infrastructure used by the applications 2106. The libraries 2110 can include system libraries 2118 (e.g., C standard library) that provide functions such as memory allocation functions, string manipulation functions, mathematic functions, and the like. In addition, the libraries 2110 can include API libraries 2124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2110 can also include a wide variety of other libraries 2128 to provide many other APIs to the applications 2106.

The frameworks 2108 provide a common high-level infrastructure that is used by the applications 2106. For example, the frameworks 2108 provide various graphical user interface (GUI) functions, high-level resource management, and high-level location services. The frameworks 2108 can provide a broad spectrum of other APIs that can be used by the applications 2106, some of which may be specific to a particular operating system or platform.

In an example, the applications 2106 may include a home application 2136, a contacts application 2130, a browser application 2132, a book reader application 2134, a location application 2142, a media application 2144, a messaging application 2146, a game application 2148, and a broad assortment of other applications such as a third-party application 2140. The applications 2106 are programs that execute functions defined in the programs. Various programming languages can be employed to create one or more of the applications 2106, structured in a variety of manners, such as object-oriented programming languages (e.g., Objective-C, Java, or C++) or procedural programming languages (e.g., C or assembly language). In a specific example, the third-party application 2140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2140 can invoke the API calls 2150 provided by the operating system 2112 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method, comprising:
providing, on a first device associated with a first user, display of a send interface for sharing media content as captured by a camera of the first device, the send interface including a first button which is user-selectable to create a content collection based on the media content,
wherein the content collection corresponds to a collection of media content items which is automatically played back according to a predefined order, and which is advanced or reversed in response to predefined user input; and
receiving, from the first device, an indication of first user input selecting the first button;

providing, in response to receiving the indication of first user input, display of an overlay on the send interface,
wherein the overlay includes a second button and a third button, the second button being user-selectable to create the content collection as private which limits adding media content to the content collection to the first user, and the third button being user-selectable to create the content collection as shared which permits any user who joined the content collection to add media content to the content collection;
receiving, from the first device, an indication of second user input provided via the overlay to share the content collection between the first user and a second user selected by the first user, the second user corresponding to a contact of the first user;
storing, in response to receiving the indication of second user input, the content collection in association with the first user and the second user;
providing, based on the storing, the first user with a first set of permissions for accessing the content collection; and
providing, based on the storing, the second user with a second set of permissions for accessing the content collection, the second set of permissions being more restrictive than the first set of permissions.

2. The method of claim 1, wherein the content collection is created by the first user via the first device.

3. The method of claim 1, wherein the first set of permissions authorizes the first user to delete the content collection, rename the content collection, add or remove users associated with the content collection, save the content collection, add media content to the content collection, and view the content collection.

4. The method of claim 3, wherein the first set of permissions includes a user-selectable option to automatically save any media content added by the first user with respect to the content collection.

5. The method of claim 1, wherein the second set of permissions authorizes the second user to leave the content collection, add users associated with the content collection, add media content to the content collection, and view the content collection.

6. The method of claim 5, wherein the second set of permissions includes a user-selectable option to automatically save any media content added by the second user with respect to the content collection.

7. The method of claim 5, wherein leaving the content collection comprises:
removing the association between the content collection and the second user; and
removing any media content added by the second user from the content collection.

8. A system comprising:
a processor; and
a memory storing instructions that, when executed by the processor, configure the processor to perform operations comprising:
providing, on a first device associated with a first user, display of a send interface for sharing media content as captured by a camera of the first device, the send interface including a first button which is user-selectable to create a content collection based on the media content,
wherein the content collection corresponds to a collection of media content items which is automatically played back according to a predefined order, and which is advanced or reversed in response to predefined user input; and
receiving, from the first device, an indication of first user input selecting the first button;
providing, in response to receiving the indication of first user input, display of an overlay on the send interface,
wherein the overlay includes a second button and a third button, the second button being user-selectable to create the content collection as private which limits adding media content to the content collection to the first user, and the third button being user-selectable to create the content collection as shared which permits any user who joined the content collection to add media content to the content collection:
receiving, from the first device, an indication of second user input provided via the overlay to share the content collection between the first user and a second user selected by the first user, the second user corresponding to a contact of the first user;
storing, in response to receiving the indication of second user input, the content collection in association with the first user and the second user;
providing, based on the storing, the first user with a first set of permissions for accessing the content collection; and
providing, based on the storing, the second user with a second set of permissions for accessing the content collection, the second set of permissions being more restrictive than the first set of permissions.

9. The system of claim 8, wherein the content collection is created by the first user via the first device.

10. The system of claim 8, wherein the first set of permissions authorizes the first user to delete the content collection, rename the content collection, add or remove users associated with the content collection, save the content collection, add media content to the content collection, and view the content collection.

11. The system of claim 10, wherein the first set of permissions includes a user-selectable option to automatically save any media content added by the first user with respect to the content collection.

12. The system of claim 8, wherein the second set of permissions authorizes the second user to leave the content collection, add users associated with the content collection, add media content to the content collection, and view the content collection.

13. The system of claim 12, wherein the second set of permissions includes a user-selectable option to automatically save any media content added by the second user with respect to the content collection.

14. The system of claim 12, wherein leaving the content collection comprises:
removing the association between the content collection and the second user; and
removing any media content added by the second user from the content collection.

15. A non-transitory computer-readable storage medium, the computer-readable storage medium including instructions that when executed by a computer, cause the computer to perform operations comprising:
providing, on a first device associated with a first user, display of a send interface for sharing media content as captured by a camera of the first device, the send interface including a first button which is user-selectable to create a content collection based on the media content, wherein the content collection corresponds to a collection of media content items which is automatically played back according to a predefined order, and which is advanced or reversed in response to predefined user input; and receiving, from the first device, an indication of first user input selecting the first button;

providing, in response to receiving the indication of first user input, display of an overlay on the send interface, wherein the overlay includes a second button and a third button, the second button being user-selectable to create the content collection as private which limits adding media content to the content collection to the first user, and the third button being user-selectable to create the content collection as shared which permits any user who joined the content collection to add media content to the content collection;

receiving, from the first device, an indication of second user input provided via the overlay to share the content collection between the first user and a second user selected by the first user, the second user corresponding to a contact of the first user;

storing, in response to receiving the indication of second user input, the content collection in association with the first user and the second user;

providing, based on the storing, the first user with a first set of permissions for accessing the content collection; and providing, based on the storing, the second user with a second set of permissions for accessing the content collection, the second set of permissions being more restrictive than the first set of permissions.

16. The computer-readable medium of claim 15, wherein the content collection is created by the first user via the first device.

17. The computer-readable medium of claim 15, wherein the first set of permissions authorizes the first user to delete the content collection, rename the content collection, add or remove users associated with the content collection, save the content collection, add media content to the content collection, and view the content collection.

18. The computer-readable medium of claim 17, wherein the first set of permissions includes a user-selectable option to automatically save any media content added by the first user with respect to the content collection.

19. A method, comprising:

providing, on a first device associated with a first user, display of a user profile interface including identifying information of the first user, the user profile interface further including a first button which is user-selectable to create a content collection based on new media content, wherein the content collection corresponds to a collection of media content items which is automatically played back according to a predefined order, and which is advanced or reversed in response to predefined user input;

receiving, from the first device, an indication of first user input selecting the first button;

providing, in response to receiving the indication of first user input, display of an overlay on the user profile interface, wherein the overlay includes a second button and a third button, the second button being user-selectable to create the content collection as private which limits adding media content to the content collection to the first user, and the third button being user-selectable to create the content collection as shared which permits any user who joined the content collection to add media content to the content collection;

receiving, from the first device, an indication of second user input provided via the overlay to share the content collection between the first user and a second user selected by the first user, the second user corresponding to a contact of the first user;

storing, in response to receiving the indication of second user input, the content collection in association with the first user and the second user;

providing, based on the storing, the first user with a first set of permissions for accessing the content collection, and providing, based on the storing, the second user with a second set of permissions for accessing the content collection, the second set of permissions being more restrictive than the first set of permissions.

* * * * *